United States Patent
Van der Blom (12)

(10) Patent No.: US 7,461,582 B2
(45) Date of Patent: Dec. 9, 2008

(54) DEVICE COMPRISING A COMBINATION OF A CHAMBER AND A PISTON

(76) Inventor: Nicolaas Van der Blom, Gaerdet 12, 3460 Birkerod (DK)

( * ) Notice: Subject to any disclaimer, the term of this patent is extended or adjusted under 35 U.S.C. 154(b) by 528 days.

(21) Appl. No.: 11/040,118

(22) Filed: Jan. 24, 2005

(65) Prior Publication Data
US 2008/0006147 A1 Jan. 10, 2008

(51) Int. Cl.
*F16J 10/00* (2006.01)
(52) U.S. Cl. .................... 92/6 R; 92/6 D; 92/169.1
(58) Field of Classification Search .......... 91/422; 92/62, 169.1, 193, 195, 198, 200, 203, 207, 92/6 R, 6 D
See application file for complete search history.

(56) References Cited

U.S. PATENT DOCUMENTS

| 1,266,252 | A | * | 5/1918 | Hadford | 417/480 |
| 2,710,077 | A | * | 6/1955 | Fabel et al. | 92/193 |
| 3,908,512 | A | * | 9/1975 | Strubin | 92/169.1 |
| 4,048,905 | A | * | 9/1977 | Souslin | 91/422 |
| 4,901,828 | A | * | 2/1990 | Schmidt et al. | 188/288 |
| 5,577,579 | A | * | 11/1996 | Derr | 188/315 |

FOREIGN PATENT DOCUMENTS

| GB | 2023715 A | 3/1980 |
| GB | 2070731 A | 9/1981 |

* cited by examiner

*Primary Examiner*—Igor Kershteyn

(57) ABSTRACT

The object of the invention is to provide a reliable and inexpensive combination of a chamber and a piston to be used in any device where such a combination is needed so that it complies with specific demands towards the operation force for e.g. pumps, specifically manually operated pumps. By a device comprising a chamber and a piston positioned inside the chamber said chamber and said piston relatively movable to each other in a predetermined direction of movement between a first position and a second position of which the cross-section of the chamber in a plane perpendicular to the direction of movement is larger at the first position than at the second position, the change in the cross section of the chamber is essentially continuous between the first position and the second position and the cross-section of the chamber. It is further possible that the piston has a fixed geometrical shape, that the wall of the chamber has different sizes of cross-sections in the direction of the movement and is arranged to adapt itself to the piston. Moreover, both the piston and the wall of the chamber can adapt itself to each other.

2 Claims, 30 Drawing Sheets

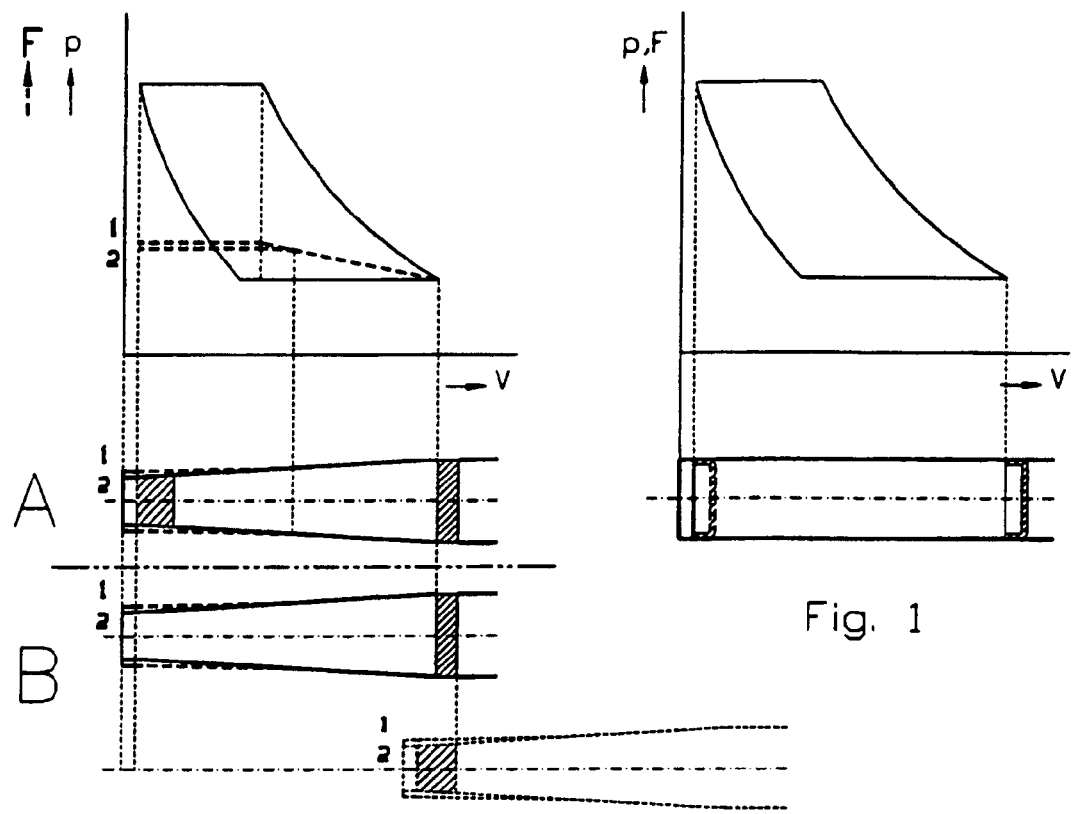
Fig. 2A
Fig. 1
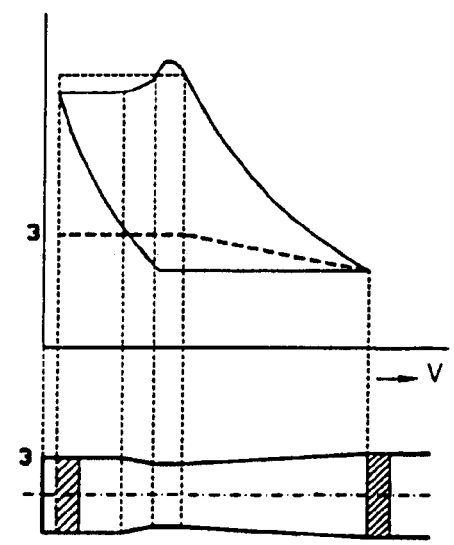
Fig. 2B

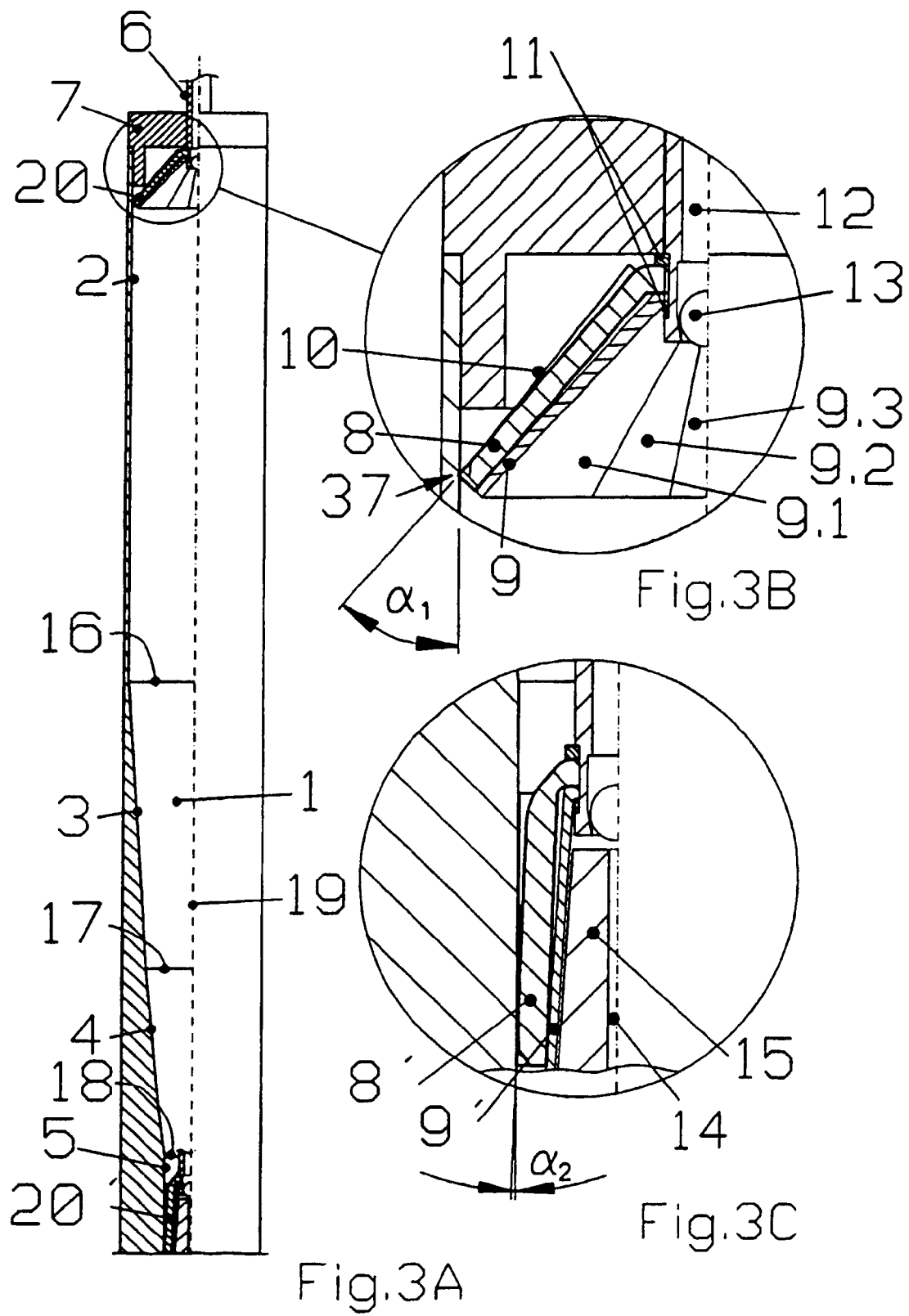

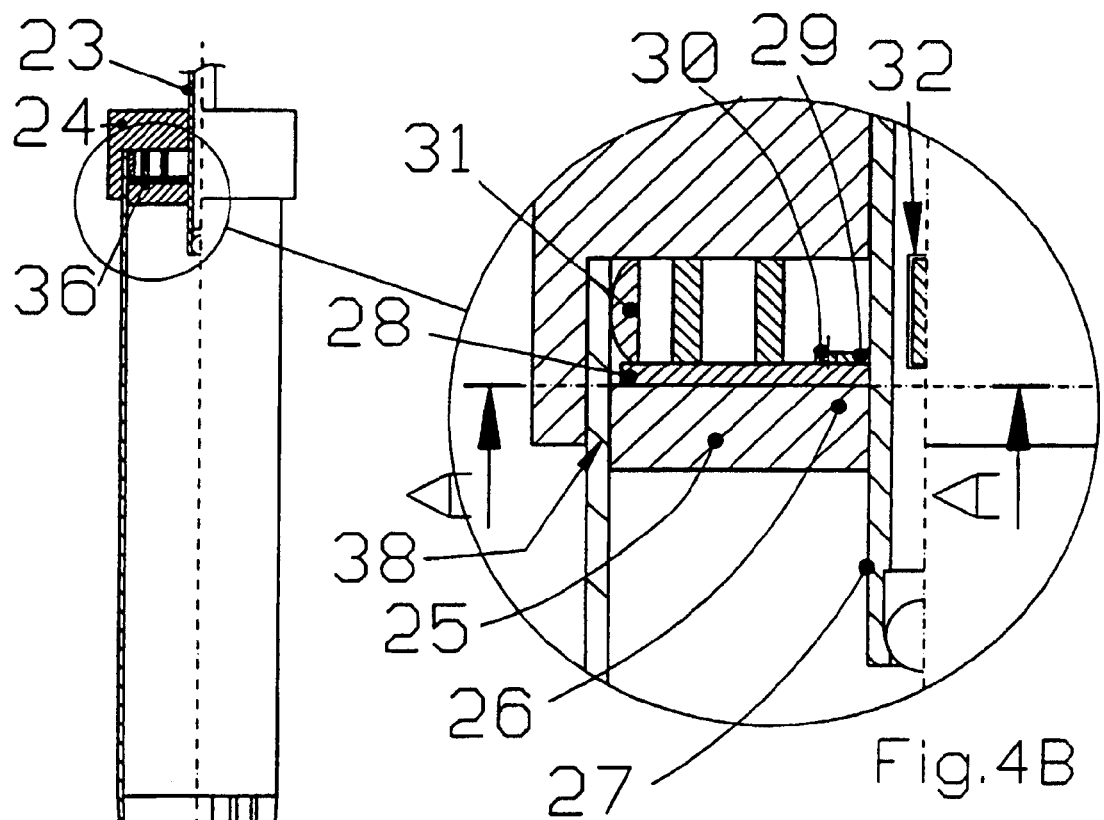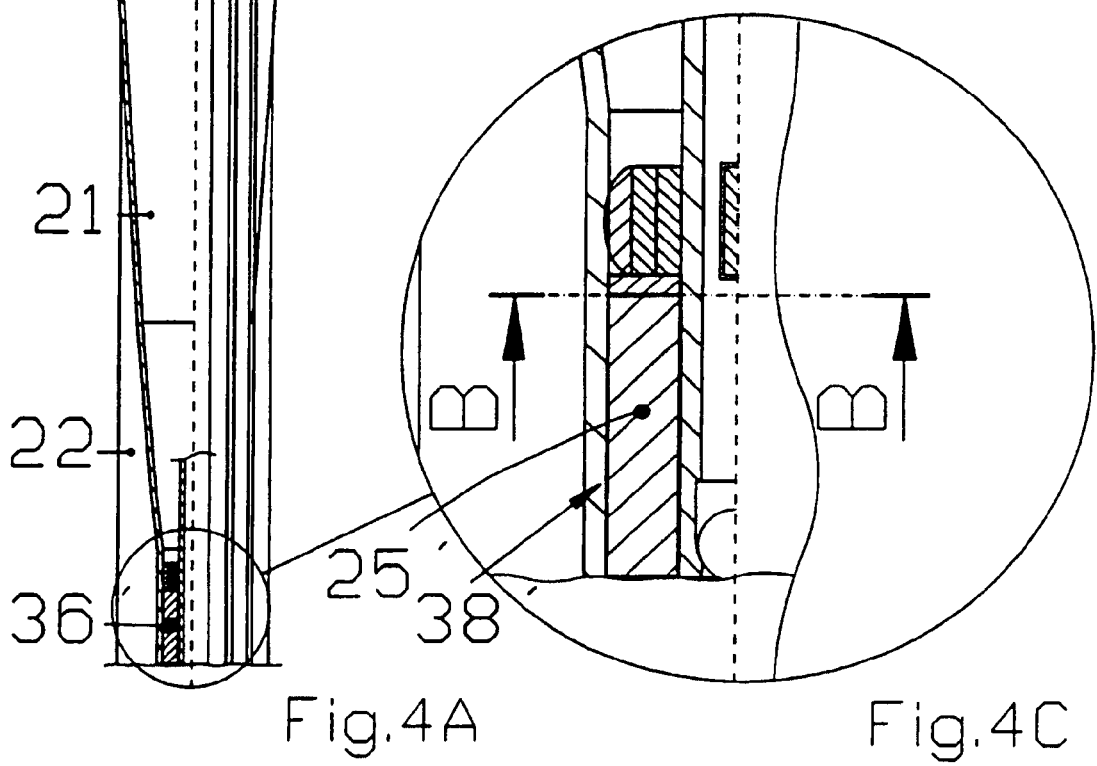
Fig.4A Fig.4B Fig.4C

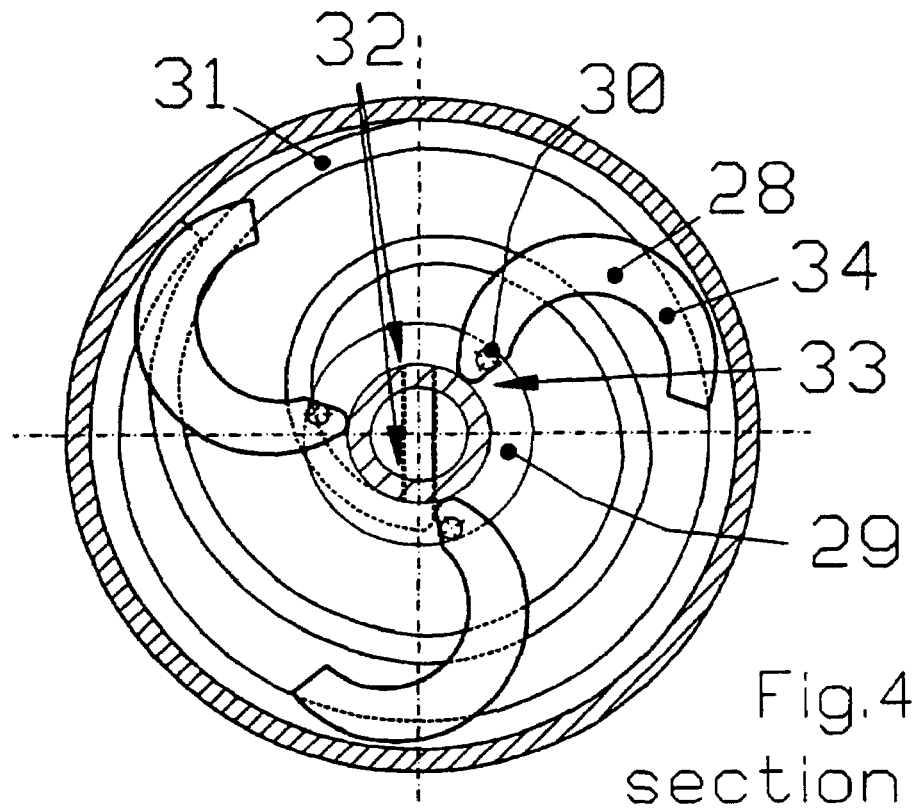
Fig.4D section A-A
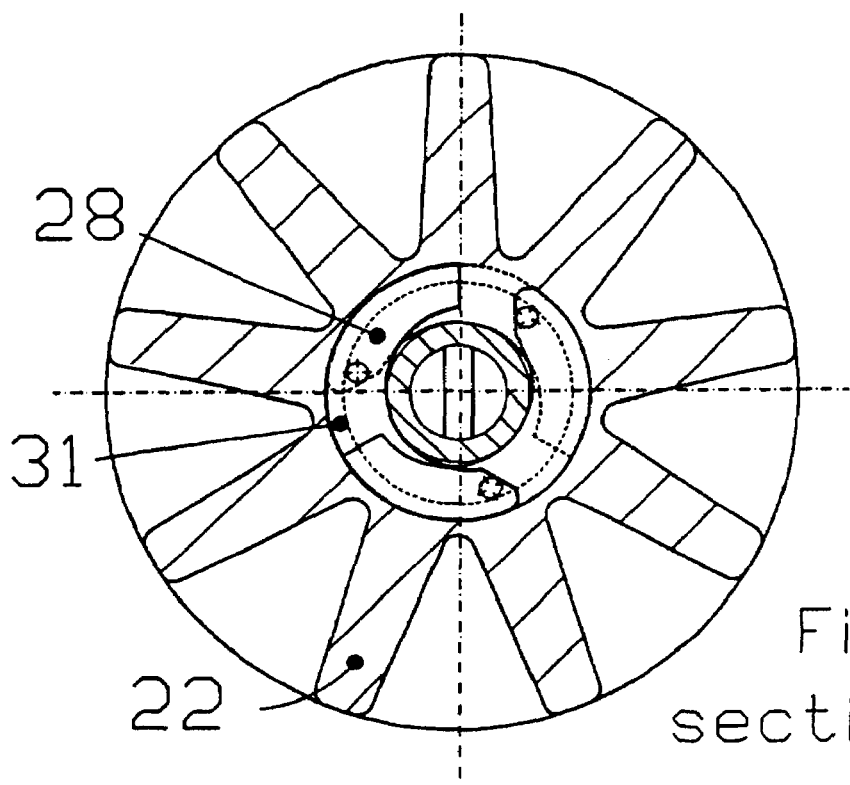
Fig.4E section B-B section A-A

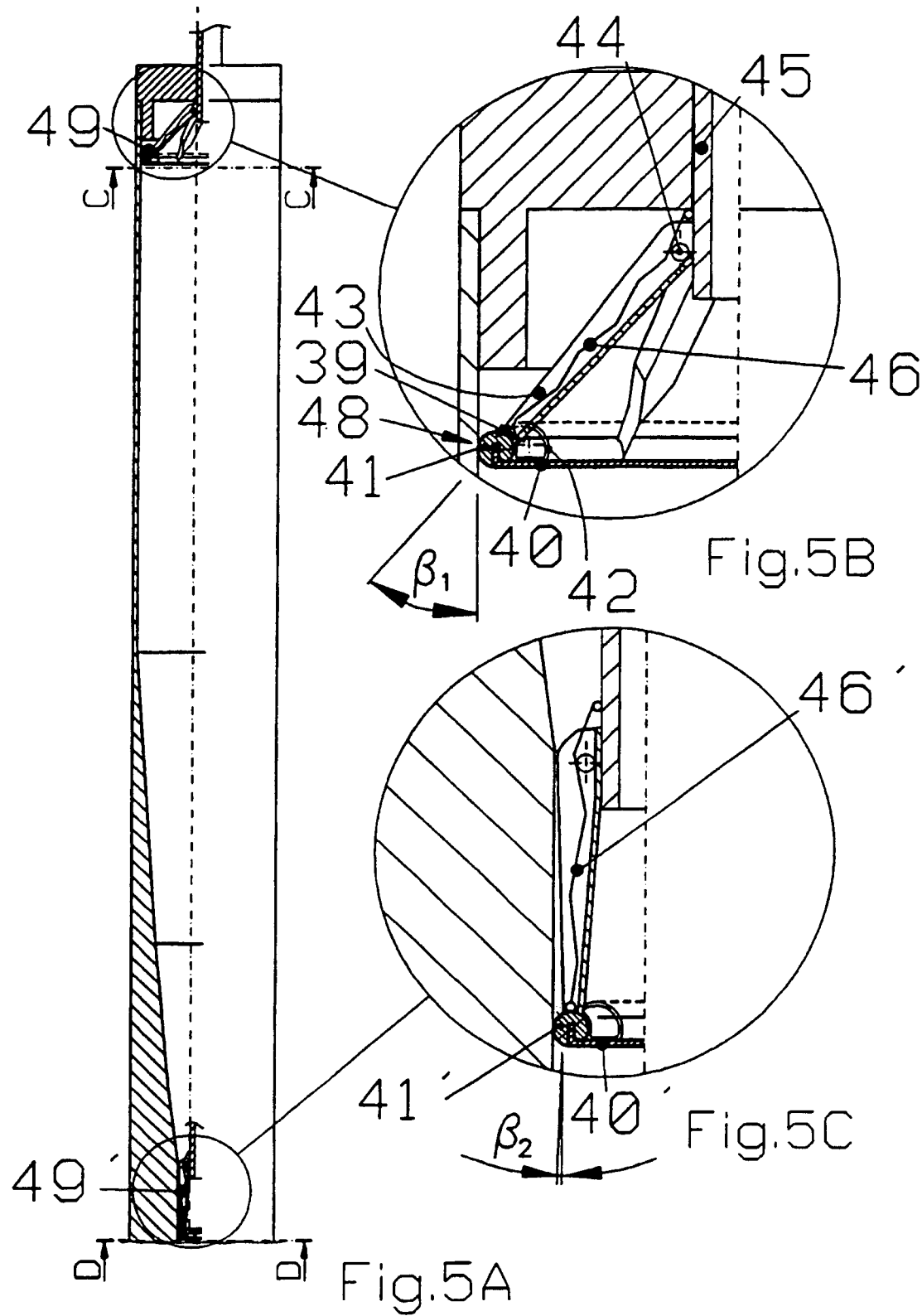

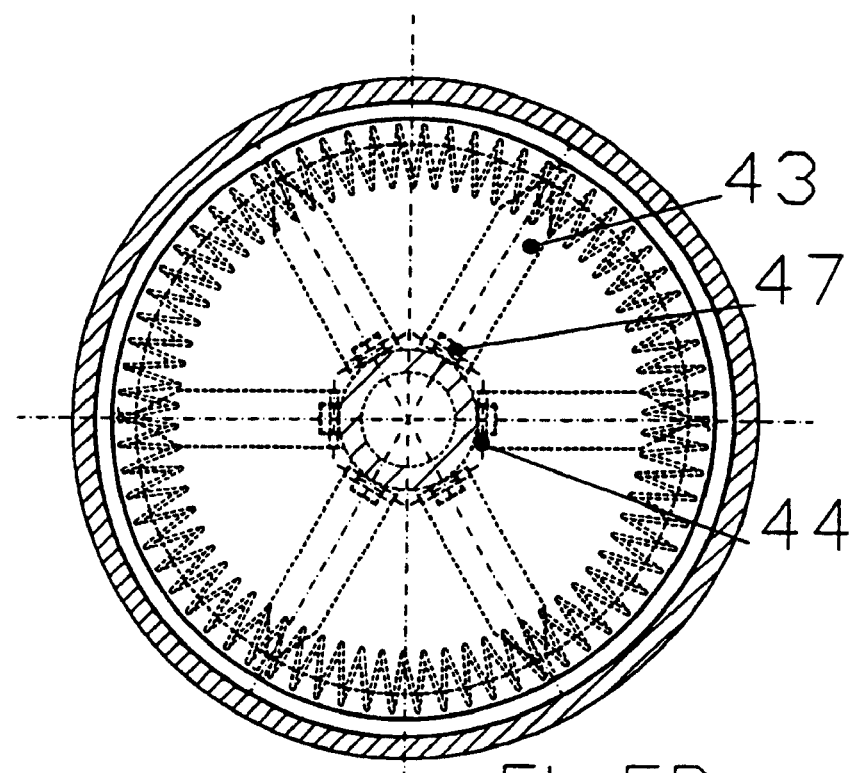
Fig.5D section C-C
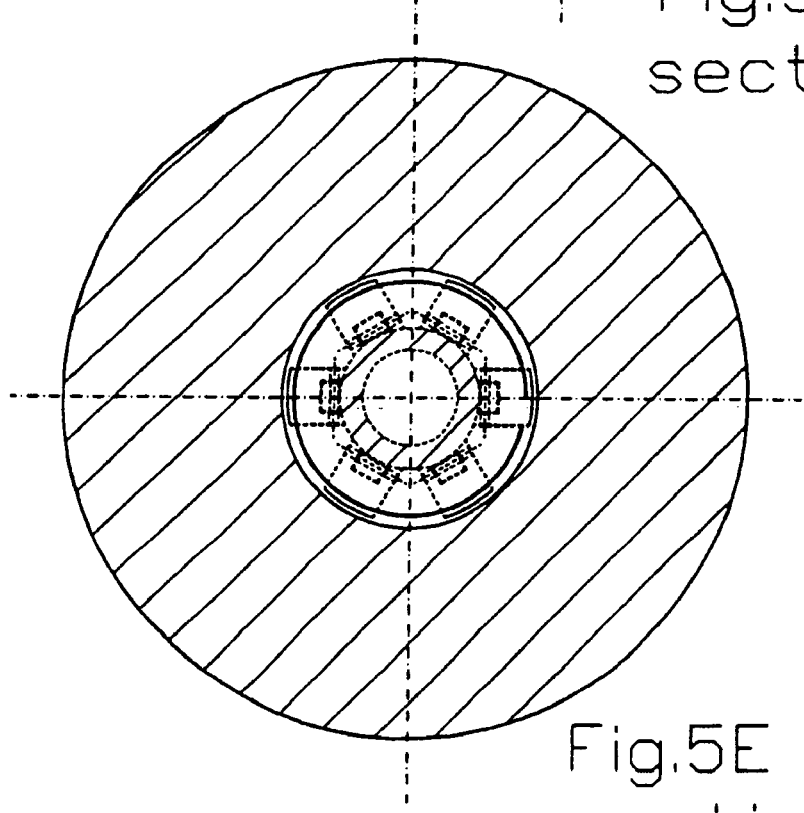
Fig.5E section D-D

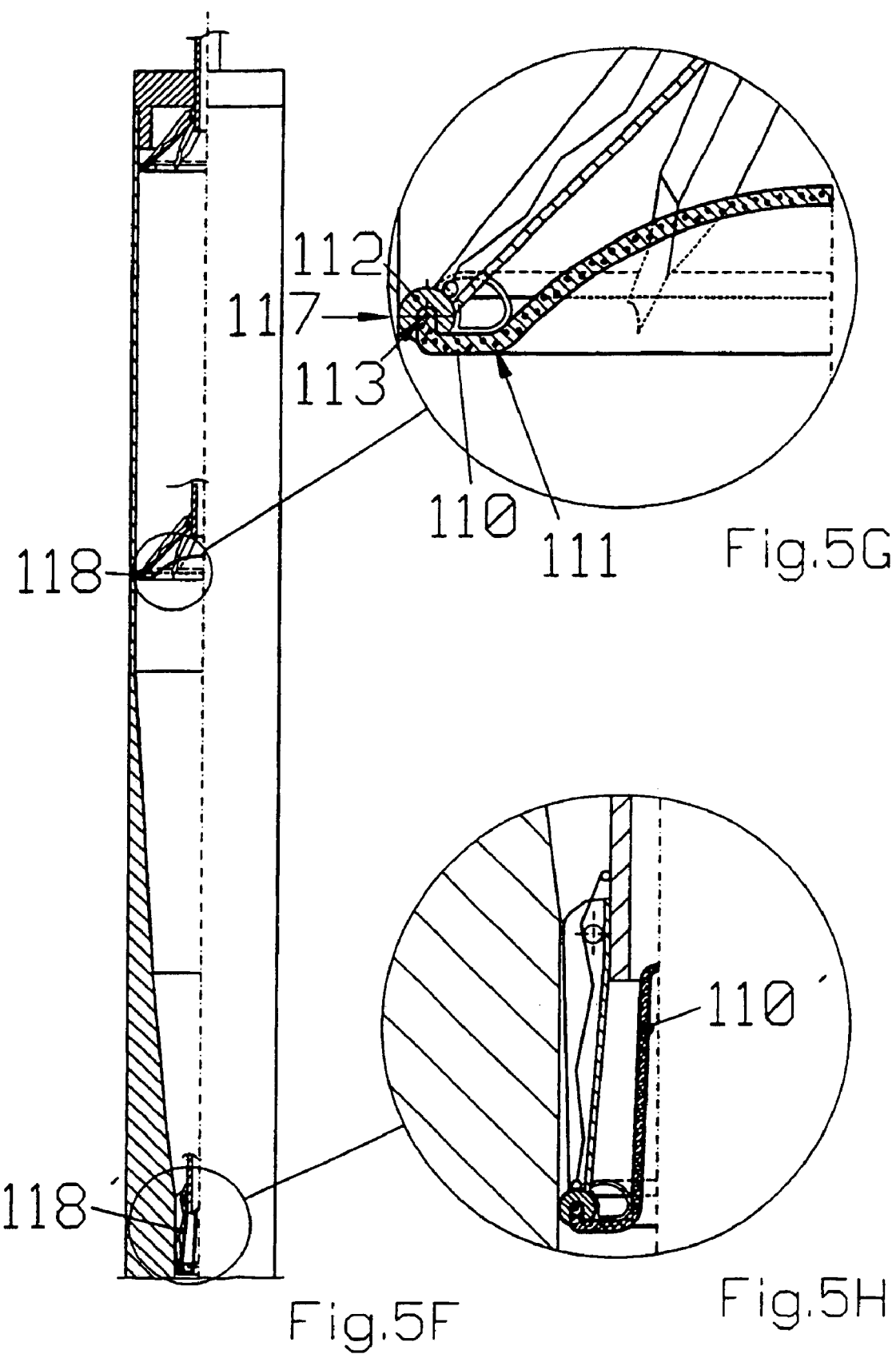

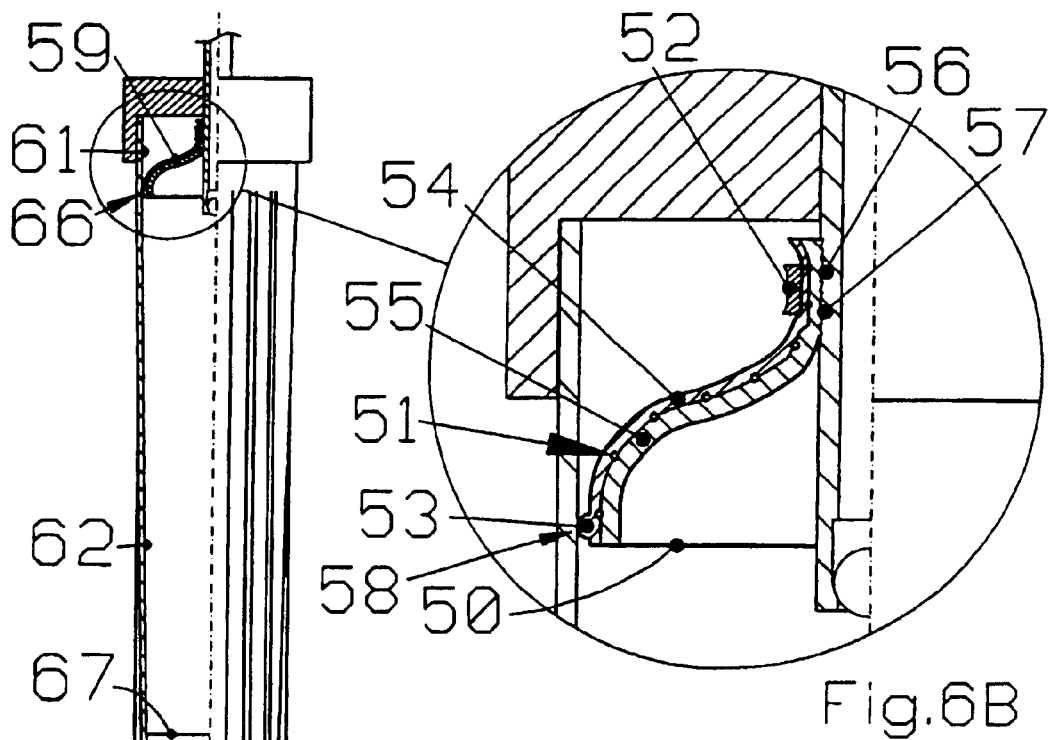
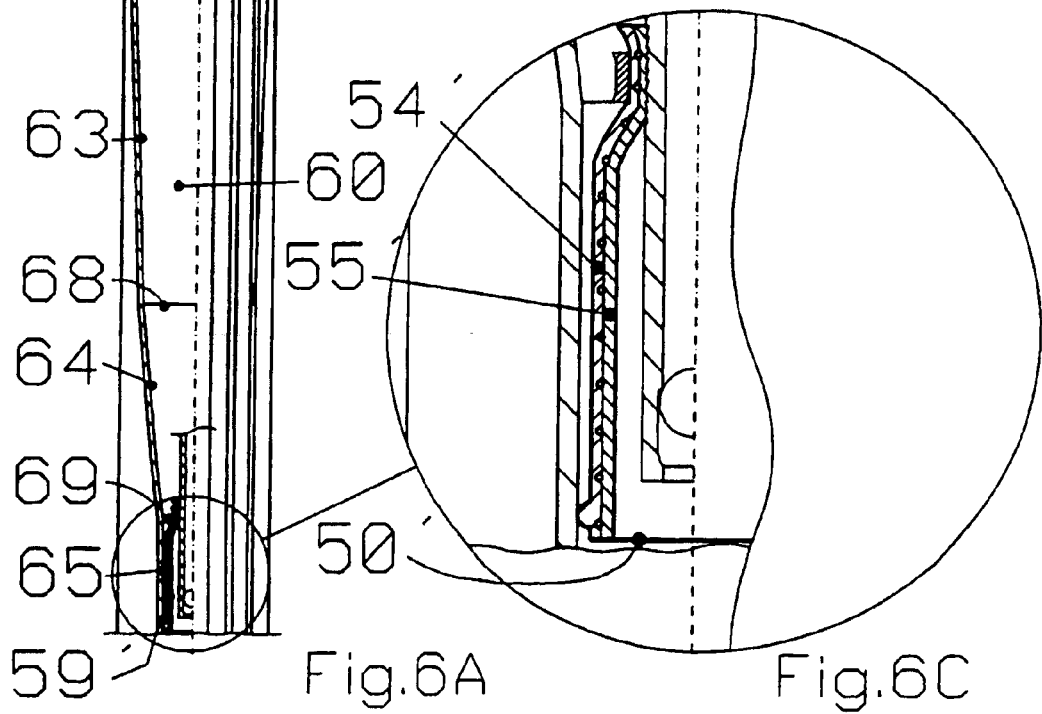
Fig. 6B
Fig. 6A
Fig. 6C

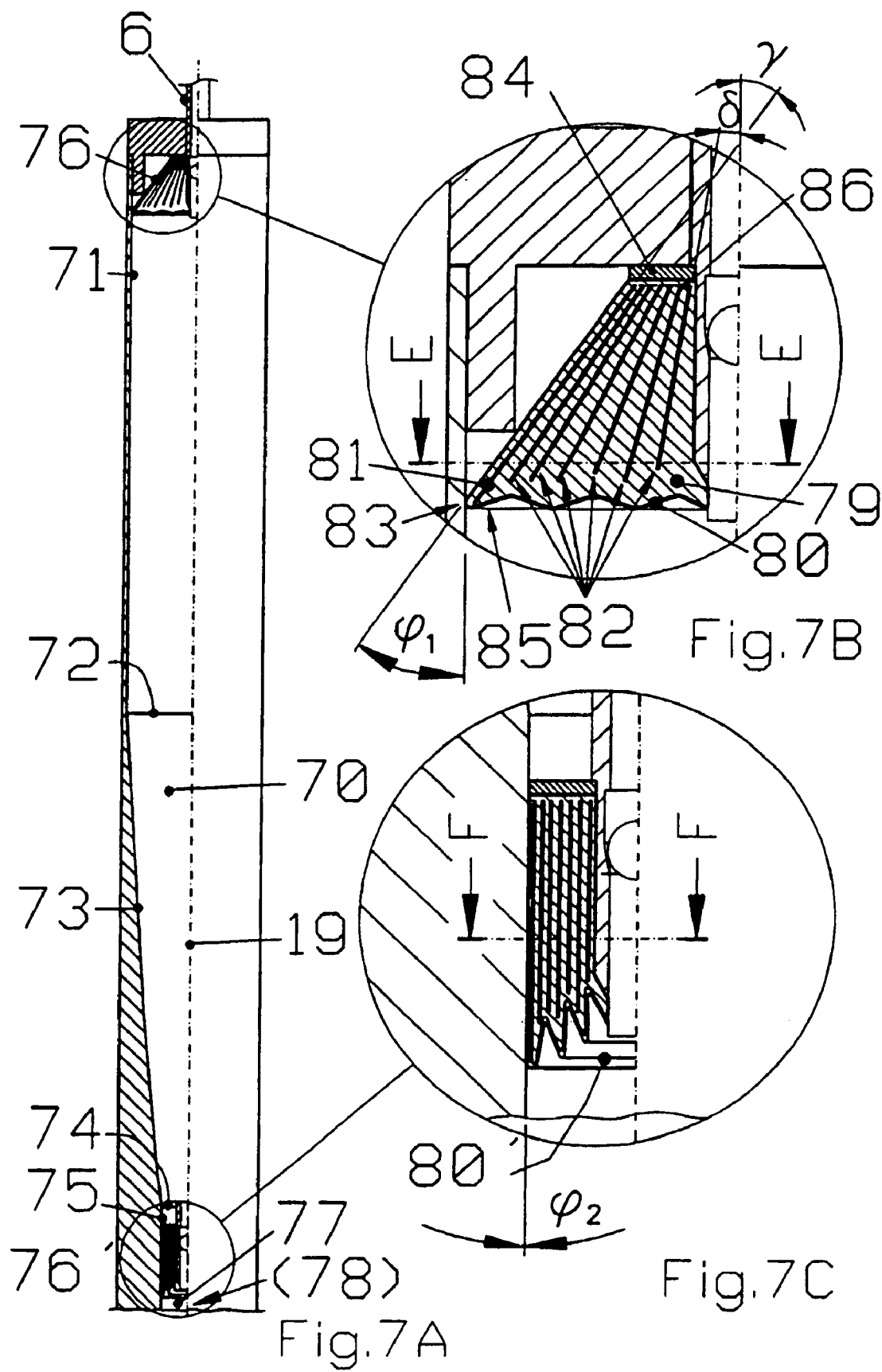

section E-E section F-F

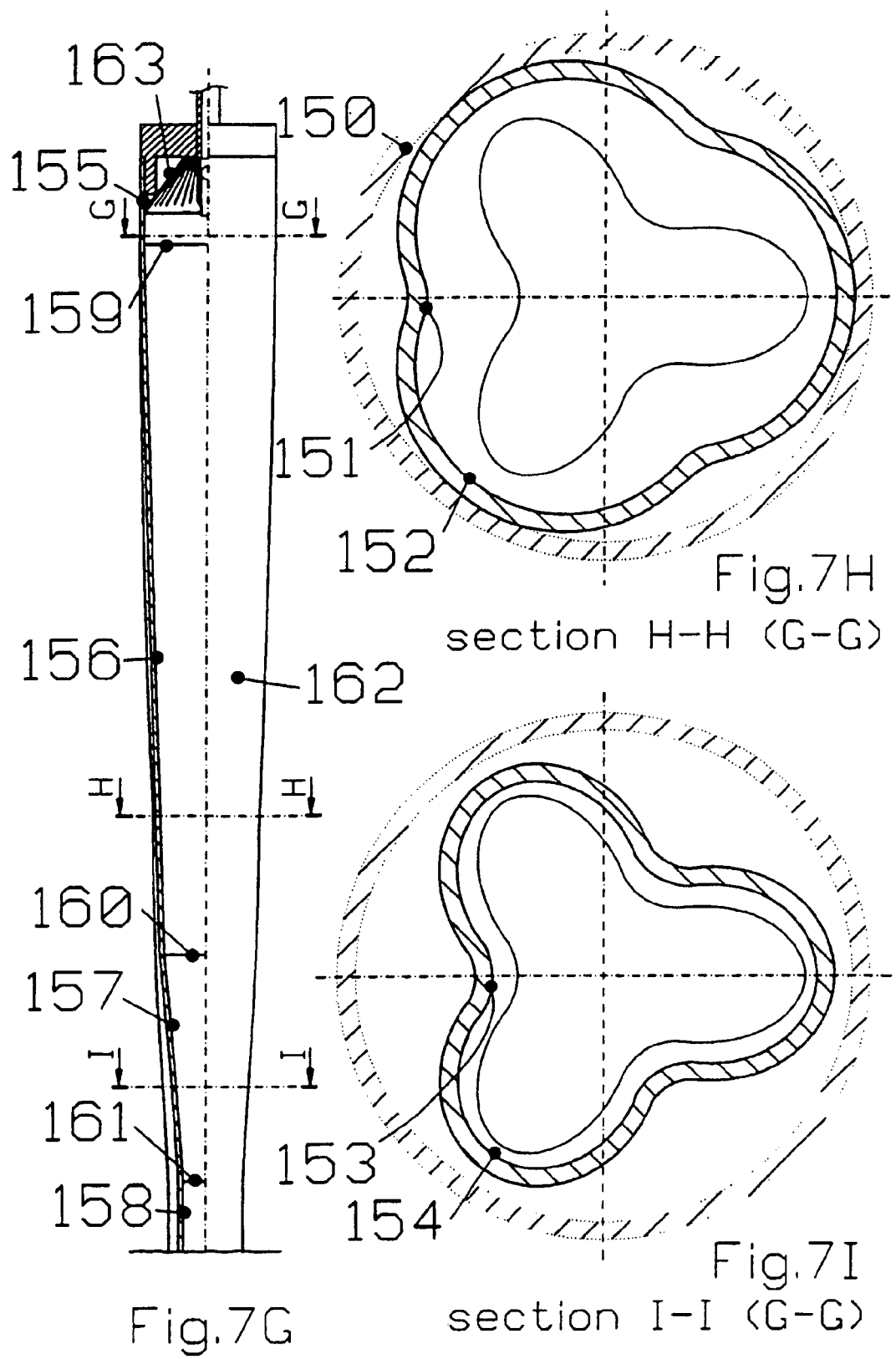

section H-H (G-G)

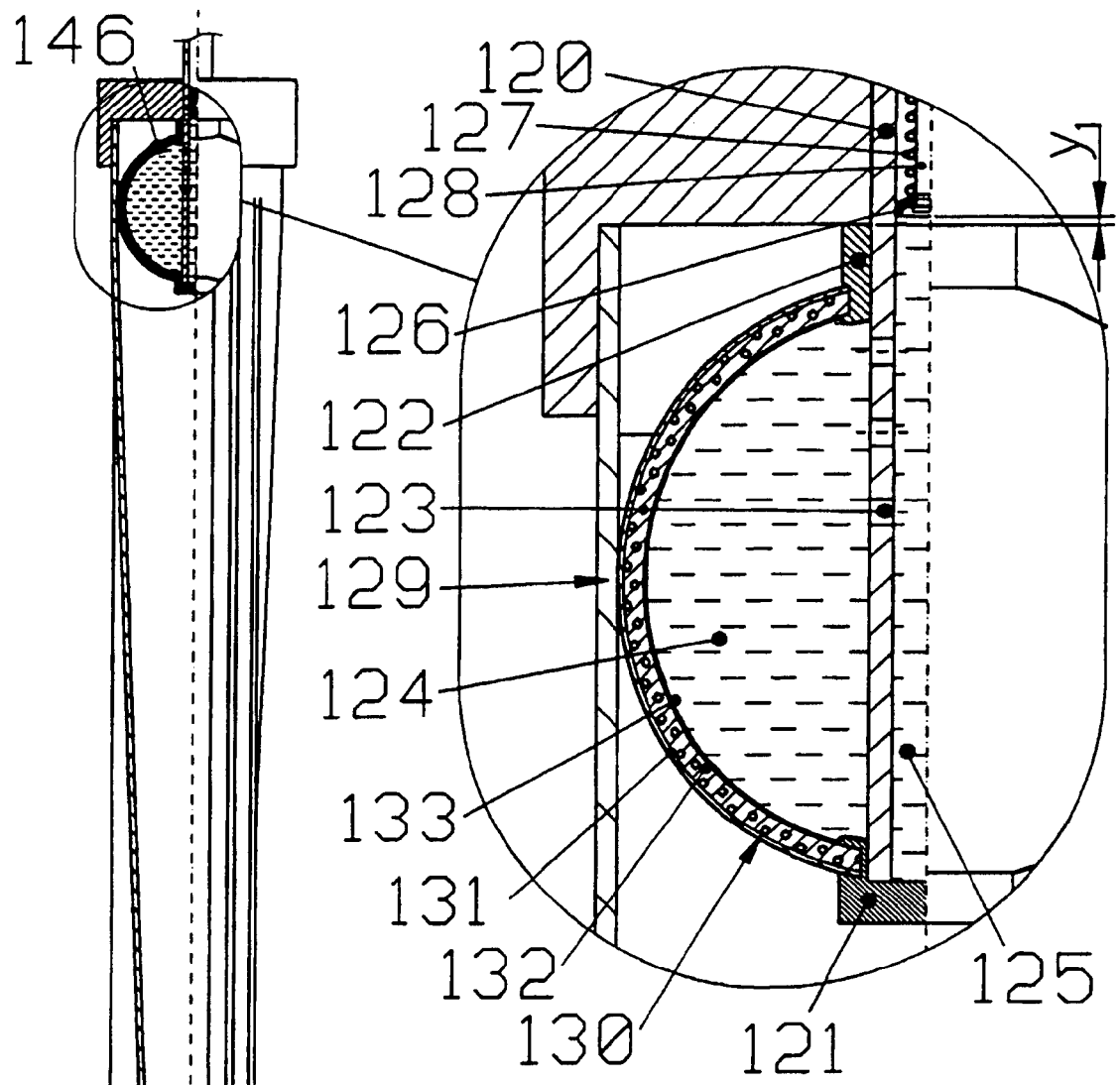
Fig. 9B
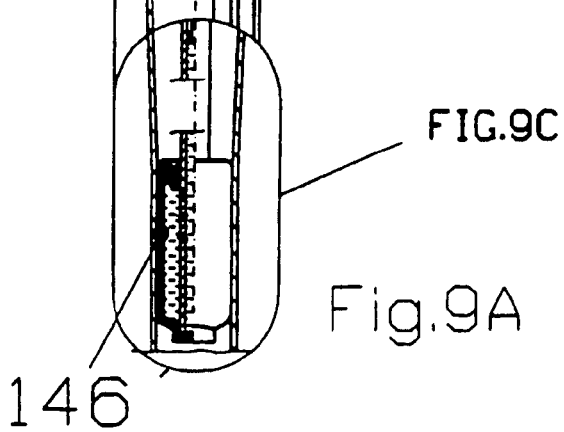
Fig. 9A
Fig. 9C

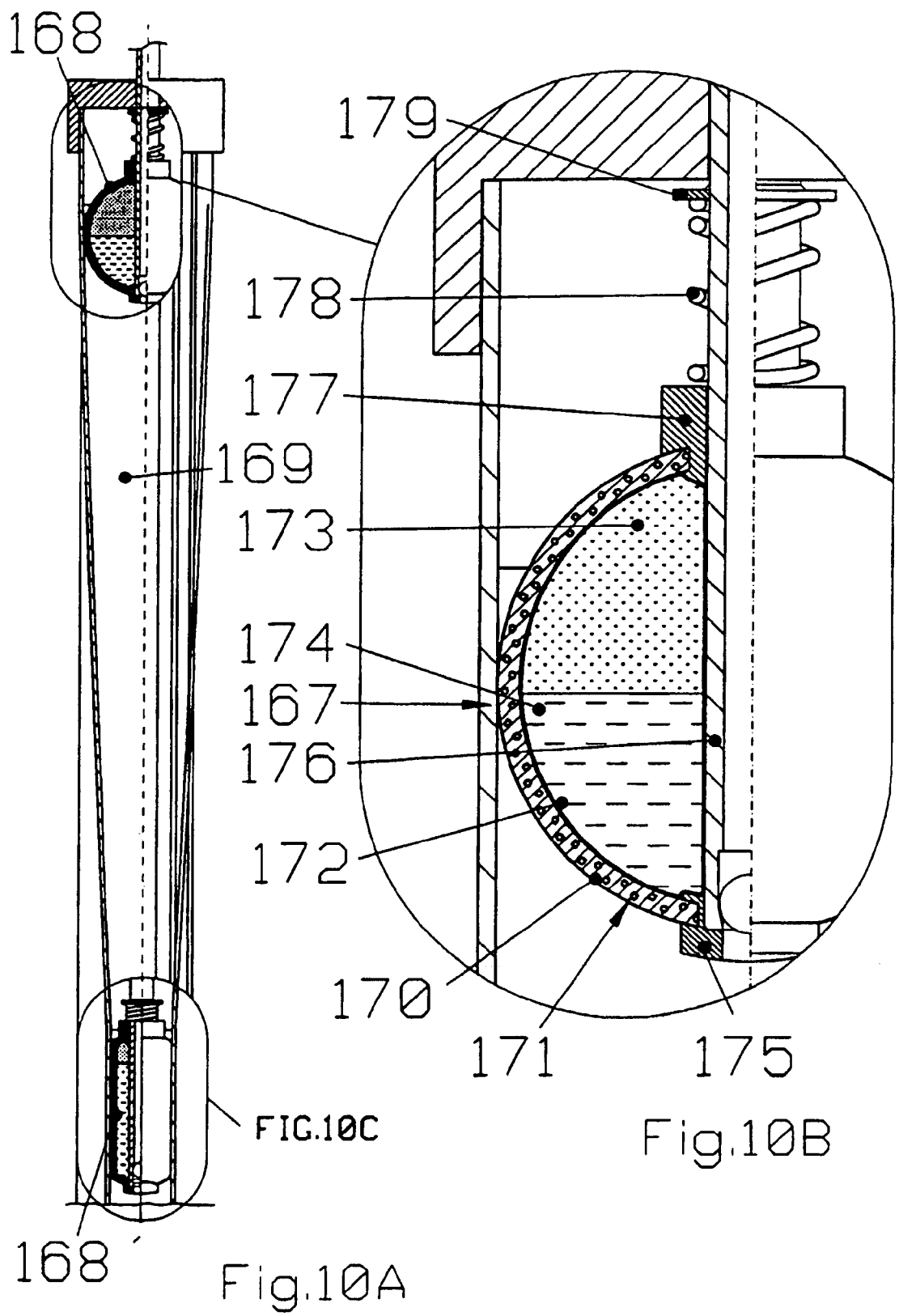

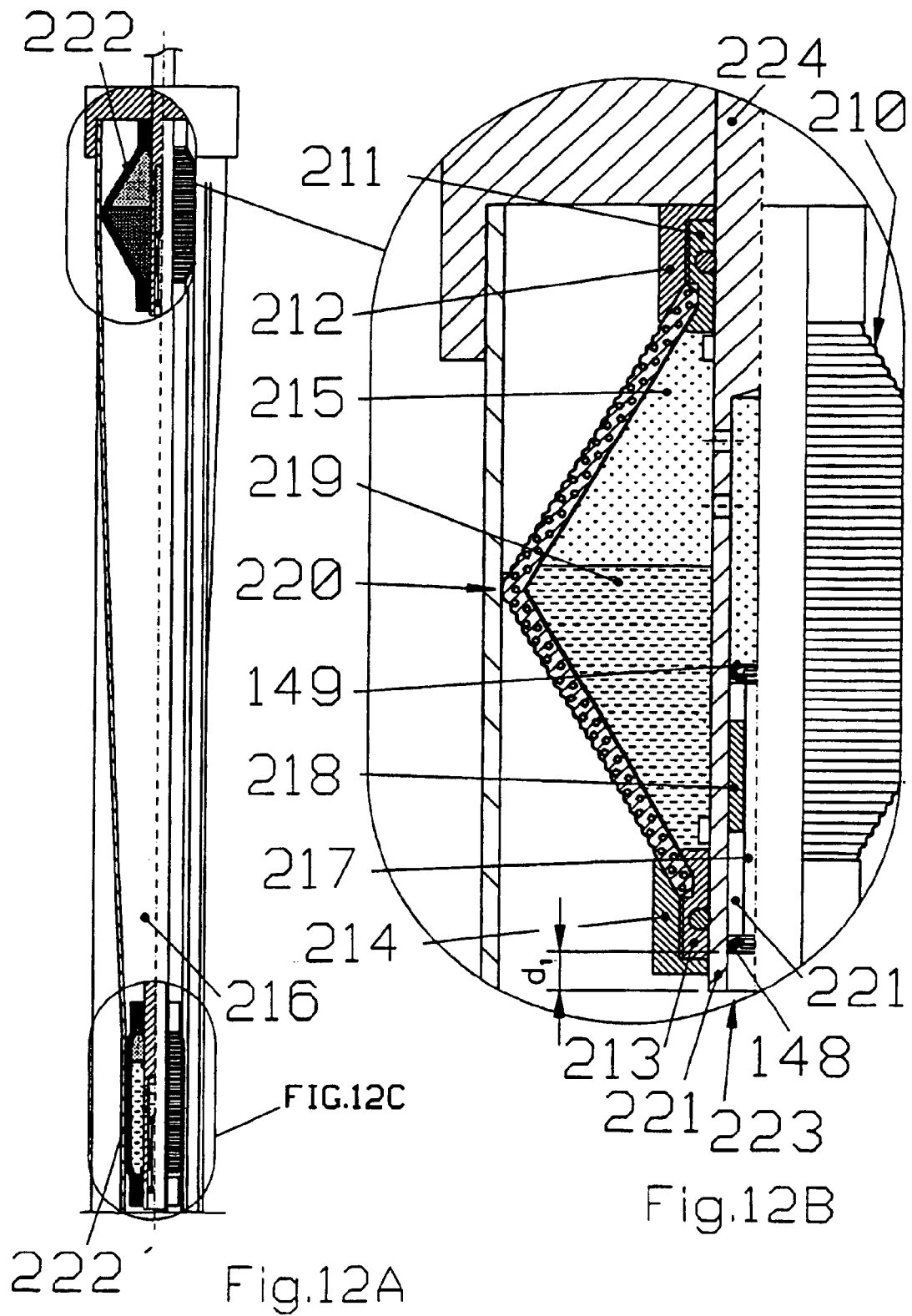

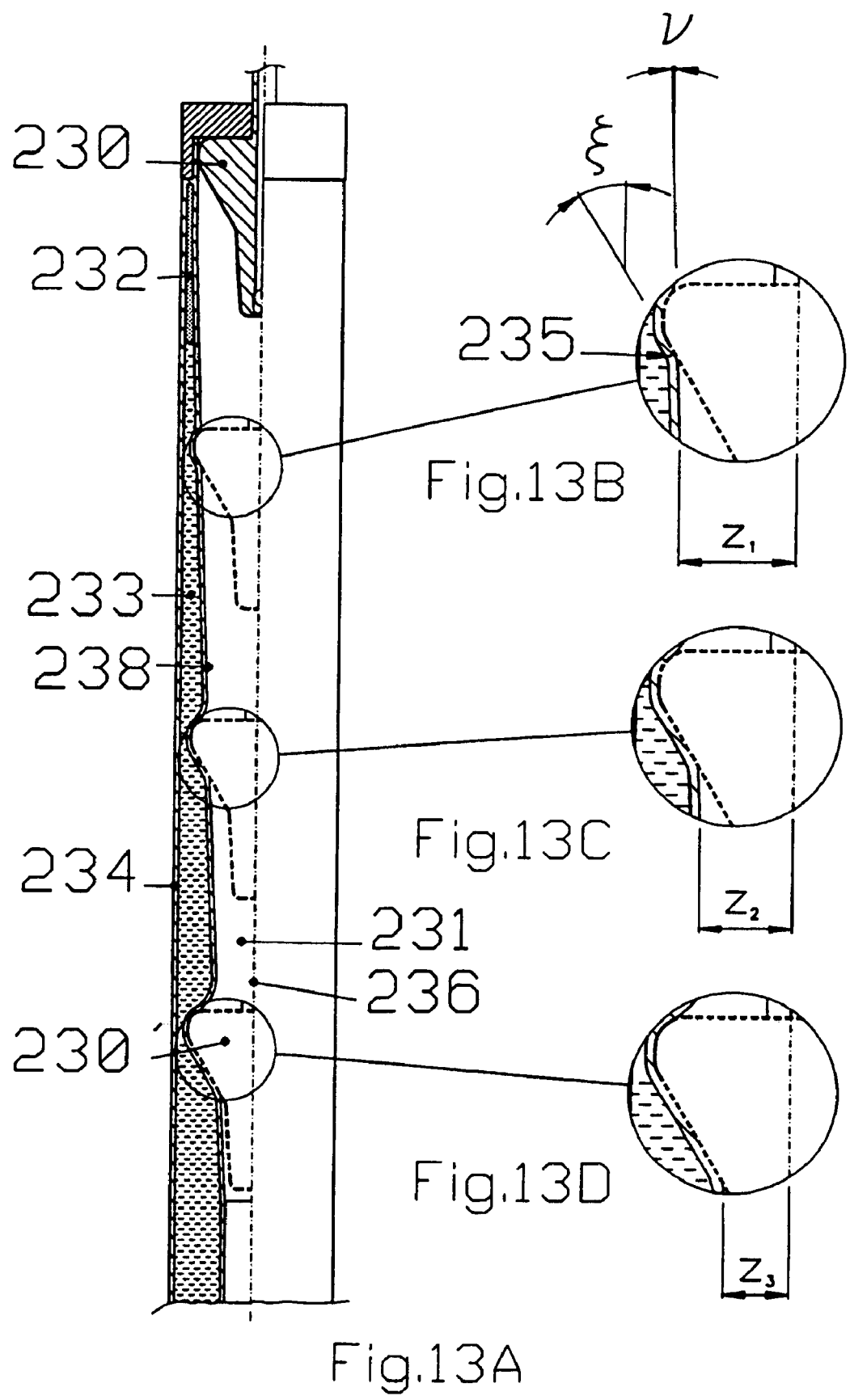

DEVICE COMPRISING A COMBINATION OF A CHAMBER AND A PISTON

TECHNICAL FIELD

This invention concerns a device comprising a combination of a chamber and a piston positioned in the chamber, said chamber and said piston relatively movable to each other in a predetermined direction of movement between a first and a second position. Such combinations can be used in any device where a combination of a chamber and a piston is needed. Examples of these devices are any kind of piston pumps, specifically manually operated piston pumps, actuators, shock absorbers, motors etc.

BACKGROUND OF THE INVENTION

A problem with existing manually operated piston pumps is that the arms or leg(s) of the user of the pump are loaded directly. The force that needs to be applied to operate the pump increases with every stroke, if the pressure of a gaseous and/or liquid medium inside a closed body, e.g. a tyre, is to be increased. The force remains the same if the medium is a non-compressable liquid, as e.g. water in water pumps. This gives the user a wrong feeling. In the design process the magnitude of these forces is often decided as a compromise between the expected weight and the initiating power of the arms or leg(s) of the user and the time it takes to pump the body. The diameter of the piston defines the level of force to be applied to operate the pump. The pumping time is also defined by the length of the cylinder of the pump. This limits the use of the pump to persons of a certain height. Bicycle and car pumps are clear examples. Especially high-pressure pumps are optimized for male users (design starting point: 75 kg weight, 1.75 m length) despite the fact that women and teenagers make up the largest group of racer bike users.

When pressures ranging from 4-13 Bar have to be obtained using the same pump, e.g. a high-pressure bike pump, the combination of low pumping time for low-pressure high-volume tyres and low forces for high-pressure low-volume tyres becomes a problem, if the pump is a hand-operated (floor) pump. If a low-pressure tyre with a relatively large volume has to be pumped by a high-pressure pump, it takes longer time than necessary and the user does not feel any reaction forces at all which gives the user a wrong feeling. It is often difficult to get the right tire pressure of a high pressure tire with e.g. a high pressure floor pump, because often only a part of a last pump stroke is required, mostly not at the end of the stroke. Therefore it is difficult to control the movement and stop of the piston because of a too high operating force. New types of bicycles and tyres were introduced at the beginning of the 1980's. These new bicycles are widely used as transportation means. Therefore, universal piston pumps have been observed in the patent literature. These pumps can pump both low-pressure and high-pressure tyres by means of a reasonable amount of force and time. This is accomplished through the simultaneously application of several coaxial/parallel cylinders and pistons that can be switched on and off (e.g. DE 195 18 242 A1, DE 44 39 830 A1, DE 44 34 508 A1, PCT/SE96/00158). These solutions are expensive and sensitive towards malfunctioning due to the fact that key parts are incorporated in the pumps several times.

A bicycle floor pump which has from the outside the form of a pure single truncated cone with a movable piston is known from the early bicycle literature. The aim is apparently to reduce the operating force, as the cone is standing upside down. There exists apparently no prior art of pistons which can move in a chamber with different diameters and which seal properly and tight. This is not surprising because it is not so easy to produce a reliable piston of that kind, specifically not with the state of the art at that time even when only low pressure high volume tires existed. A leakage would not cause a problem for such a consumer product. For current high pressure pumps or those for professional purposes it is descisive that no leakage exist. The demands towards the piston construction for high pressure levels and/or low and high pressure levels, causing no leakage are different from those which solely has to do with lower pressure levels.

U.S. Pat. No. 5,503,188 concerns an organical constructed pipeline flow stopper with an inflatable impervious bag. This stopper cannot be compared with a moving piston. In a pump can the media to be compressed and/or moved continuously cause a dynamic load on the piston while the wall of the pressurized chamber of the pump can change its cross-section regarding area and/or shape perpendicular to the direction of movement of the piston between one point and another which gives specific sealing problems. These sealing problems are solved by the present invention.

THE OBJECT OF THE INVENTION

The object of the invention is to provide a reliable and inexpensive device comprising a combination of a chamber and a piston, to which its design has to comply to specific demands towards the operating force. These devices can be specifically be piston pumps but also devices like actuators, shock absorbers or motors etc. Manually operated piston pumps will be comfortable to use by the target group without compromising pumping time, while devices which are not manually operated will gain a substantial reduction of investments and operational costs, due to a lower operating force. The invention aims to overcome the above mentioned problems.

SUMMARY OF THE INVENTION

In general, a new design for a combination of a chamber and a piston for e.g. a pump must ensure that the force to be applied to operate the pump during the entire pumping operation is low enough to be felt as being comfortable by the user, that the length of a stroke is suitable, especially for women and teenagers, that the pumping time is not prolonged, and that the pump has a minimum of components reliable and almost free of maintenance time.

According to the invention, these requirements are fulfilled by means of the provisions in the characterization part of claim 1. By a device, comprising a chamber and a piston positioned inside said chamber and said piston relatively movable to each other in a predetermined direction of movement between a first position and a second position of which the cross-section of the chamber in a plane perpendicular to the direction of movement is larger at the first position than at the second position, the change in the cross-section of the chamber is essentially continuous between the first position and the second position and the cross-section of the piston in a plane perpendicular to the direction of movement is arranged to adapt itself to the cross-section of the chamber.

According to the invention, these requirements are fulfilled by means of the provisions in the characterization part of claim 2. By a device comprising a combination of a chamber and a piston positioned inside the chamber, the chamber and the piston relatively movable to each other in a predetermined direction of movement between a first position and a second position, the cross-section of the piston in a plane perpendicular to the direction of movement is larger at a first piston position than at a second piston position, the change of the cross-section of the piston is essentially continuous between the first piston position and the second piston position, the cross-section of the chamber in a plane perpendicular to the direction of movement is larger at the first position than at the second position, the change of the cross-section of the chamber is essentially continuous between the first position and the second position and the cross-section of the chamber is arranged to adapt itself to the cross-section of the piston.

According to the invention, these requirements are fulfilled by means of the provisions in the characterization part of claim 3. By A device comprising a combination of a chamber and a piston positioned inside the chamber, said chamber and said piston relatively movable to each other in a predetermined direction of movement between a first position and a second position, the cross-section of the piston in a plane perpendicular to the direction of movement is larger at a first piston position than at a second piston position, the change of the cross-section of the piston is essentially continuous between the first piston position and the second piston position, the cross-section of the chamber in a plane perpendicular to the direction of movement is larger at the first position than at the second position, the change of the cross-section of the chamber is essentially continuous between the first position and the second position and a cross-section of the chamber and the piston, respectively is arranged to adapt itself to the cross-section of the piston and the chamber. respectively.

BRIEF DESCRIPTION OF THE DRAWINGS

The invention is explained in detail below by means of diagrams and drawings. The following is shown in the diagrams or drawings—a transversal cross-section means a cross-section perpendicular to the moving direction of the piston and/or the chamber, while the longitudinal cross-section is the one in the direction of said moving direction:

FIG. 1 shows a so-called indicator diagram of a one-stage single working piston pump with a cylinder and a piston with a fixed diameter.

FIG. 2A shows an indicator diagram of a piston pump according the invention part A shows the option where the piston is moving, while part B shows the option where the chamber is moving.

FIG. 2B shows an indicator diagram of a pump according to the invention where the transversal cross-section increases again from a certain point of the pump stroke, by still increasing pressure.

FIG. 3A shows a longitudinal cross-section of a pump with fixed different areas of transversal cross-sections of the pressurizing chamber and a piston with radially-axially changing dimensions during the stroke—the piston arrangement is shown at the beginning and at the end of a pump stroke (first embodiment).

FIG. 3B shows an enlargement of the piston arrangement of FIG. 3A at the beginning of a stroke.

FIG. 3C shows an enlargement of the piston arrangement of FIG. 3A at the end of a stroke.

FIG. 4A shows a longitudinal cross-section of a pump with fixed different areas of the transversal cross-sections of the pressurizing chamber and a piston with radially/partially axially changing dimensions during the stroke—the piston arrangement is shown at the beginning and at the end of the pump stroke (second embodiment).

FIG. 4B shows an enlargement of the piston arrangement of FIG. 4A at the beginning of a stroke.

FIG. 4C shows an enlargement of the piston arrangement of FIG. 4A at the end of a stroke.

FIG. 4D shows section A-A of FIG. 4B.

FIG. 4E shows section B-B of FIG. 4C.

FIG. 5A shows a longitudinal cross-section of a pump with fixed different areas of the transversal cross-sections of the pressurizing chamber and a piston with radially-axially changing dimensions during the stroke—the piston arrangement is shown at the beginning and at the end of the pump stroke (third embodiment).

FIG. 5B shows an enlargement of the piston arrangement of FIG. 5A at the beginning of a stroke.

FIG. 5C shows an enlargement of the piston arrangement of FIG. 5A at the end of a stroke.

FIG. 5D shows section C-C of FIG. 5A.

FIG. 5E shows section D-D of FIG. 5A.

FIG. 5F shows the pressurizing chamber of FIG. 5A with a piston means with sealing means which is made of a composite of materials.

FIG. 5G shows an enlargement of the piston means of FIG. 5F during a stroke.

FIG. 5H shows an enlargement of the piston means of FIG. 5F at the end of a stroke, both while it is still under pressure and while it is not anymore under pressure.

FIG. 6A shows a longitudinal cross-section of a pump with fixed different areas of the transversal cross-sections of the pressurizing chamber and a fourth embodiment of the piston with radially-axially changing dimensions during the stroke—the piston arrangement is shown at the beginning and at the end of the pump stroke.

FIG. 6B shows an enlargement of the piston arrangement of FIG. 6A at the beginning of a stroke.

FIG. 6C shows an enlargement of the piston arrangement of FIG. 6A at the end of a stroke.

FIG. 7A shows a longitudinal cross-section of a pump comprising a concave portion of the wall of the pressurizing chamber with fixed dimensions and a sixth embodiment of the piston with radially-axially changing dimensions during the stroke—the piston arrangement is shown at the beginning and at the end of the pump stroke.

FIG. 7B shows an enlargement of the piston arrangement of FIG. 5A at the beginning of a stroke.

FIG. 7C shows an enlargement of the piston arrangement of FIG. 5A at the end of a stroke.

FIG. 7G shows a variant of the pressurizing chamber of FIG. 7A, which has now a longitudinal cross-section with fixed transversal cross-sections which are designed in such a way that the area decreases while the circumference of it approximately remains constant or decreases in a lower degree during a pump stroke.

FIG. 7H shows transversal cross-section G-G (dotted lines) and H-H of the of the longitudinal cross section of FIG. 7G.

FIG. 7I shows transversal cross-section G-G (dotted lines) and I-I of the of the longitudinal cross section of FIG. 7H.

FIG. 9A shows a longitudinal cross-section of a pump with fixed different areas of the transversal cross-sections of the pressurizing chamber and an eight embodiment of the piston with radially-axially changing dimensions during the stroke—the piston arrangement is shown at the beginning and at the end of a pump stroke.

FIG. 9B shows an enlargement of the piston arrangement of FIG. 9A at the beginning of a stroke.

FIG. 10A shows a ninth embodiment of the piston similar to the one of FIG. 9A with fixed different areas of the transversal cross-section of the pressurizing chamber.

FIG. 10B shows an enlargement of the piston of FIG. 10A at the beginning of a stroke.

FIG. 12A shows a longitudinal cross-section of a pump with fixed different areas of the transversal cross-sections of the pressurizing chamber and an eleventh embodiment of the piston with radially-axially changing dimensions during the stroke—the piston arrangement is shown at the beginning and at the end of a pump stroke.

FIG. 12B shows an enlargement of the piston of FIG. 12A at the beginning of a stroke.

FIG. 13A shows a longitudinal cross-section of a pump with variable different areas of the transversal cross-section of the pressurizing chamber and a piston with fixed geometrical sizes—the arrangement of the combination is shown at the beginning and at the end of the pump stroke.

FIG. 13B shows an enlargement of the arrangement of the combination at the beginning of a pump stroke.

FIG. 13C shows an enlargement of the arrangement of the combination during a pump stroke.

FIG. 13D shows an enlargement of the arrangement of the combination at the end a pump stroke.

DESCRIPTION OF PREFERRED EMBODIMENTS

Figure 4F:
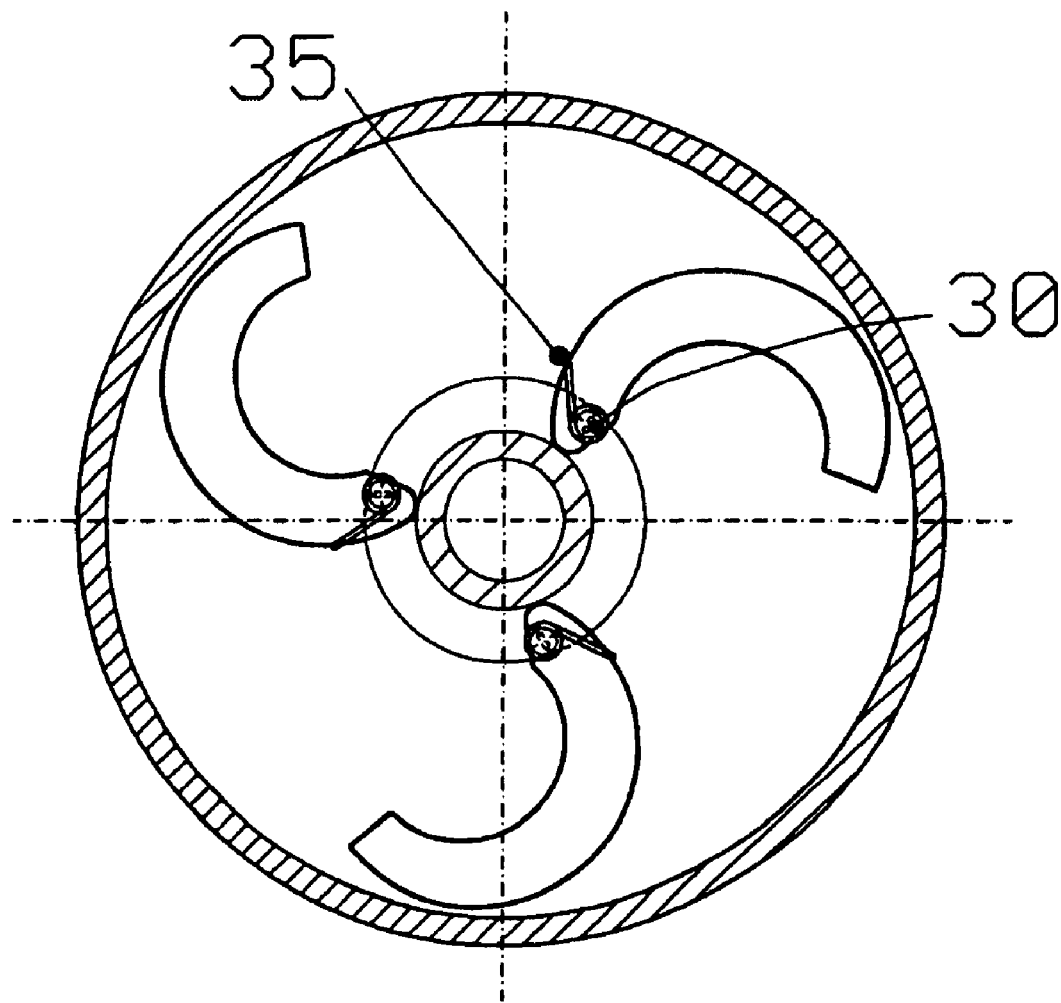
FIG. 4F shows an alternative solution for the loading portion of FIG. 4D.

FIG. 1 shows the so-called indicator diagram. This diagram schematically shows the adiabatic relation between the pressure p and the pump stroke volume V of a traditional single-stage one-way working piston pump with a cylinder with a fixed diameter. The increase in the operating force to be applied per stroke can be read directly from the diagram and is quadratic to the diameter of the cylinder. The pressure p, and thus the operating force F, increases during the stroke normally until the valve of the body to be inflated has been opened.

FIG. 2A shows the indicator diagram of a piston pump according the invention. It shows that the diagram for pressure p is similar to that of traditional pumps, but that the operating force is different and depends entirely on the chosen area of the transversal cross-section of the pressurizing chamber. This depends entirely on the specification, e.g. that the operating force should not exceed a certain maximum. The shape of the longitudinal and/or transversal cross-section of the pressurizing chamber can be any kind of curve and/or line. It is also possible that the transversal cross-section e.g. increases by increasing pressure (FIG. 2B). An example of the operating force is the dashed thick line, 1 or 2. The different wall possibilities marked 1 and 2 correspond to the earlier mentioned lines 1,2 of the diagram. The A-section relates to a pump of which only the piston is moving, while the B-section relates to pumps where only the chamber is moving. A combination of both movements at the same time is also possible.

FIG. 2B shows an example of an indicator diagram of a piston pump that has a chamber with a transversal cross-section that increases by increasing pressure.

FIGS. 3A,B,C show details of the first embodiment. The piston moves in the pressurizing chamber which comprises cylindrical and cone-shaped portions with circular transversal cross-sections with diameters that decrease when the pressure of the gaseous and/or liquid media increases. This is based on the specification that the operating force should not exceed a certain maximum. The transition between the various diameters is gradual without discrete steps. This means that the piston can slide easily in the chamber and adapt itself to the changing areas and/or shapes of the transversal cross-sections without loss of sealing ability. If the operating force has to be lowered by increasing pressure, the transversl cross-sectional area of the piston is decreasing and by that the length of the circumference as well. The circumferical length reduction is based on compression up to the buckling level or by relaxation. The longitudinal cross-section of the piston means is trapezoid with variable angle α less than e.g. 40° with the wall of the pressurizing chamber, so that it cannot deflect backwards. The dimensions of the sealing means change in three dimensions during every stroke. A supporting portion of the piston means, e.g. a disk or integrated ribs in the sealing means, e.g. positioned on the non-pressurized side during a pumping stroke of the piston protects against deflection under pressure. A loading portion of the piston means, e.g. a spring washer with several segments, can also be mounted e.g. on the pressurized side of the piston. This squeezes the flexible sealing portion towards the wall. This is expedient if the pump has not been used for some time and the piston means has been folded for some time. By moving the piston rod, the sides of the trapezoid cross-section of the sealing portion of the piston means will be pushed axially and radially, so that the sealing edge of the piston follows the decreasing diameter of the pressurizing chamber. At the end of the stroke, the bottom of the chamber in the centre has become higher in order to reduce the volume of the dead room. The piston rod is mainly guided in the cap which locks the pressurizing chamber. As the piston in both directions of its movement seals to the wall of the chamber, the piston rod e.g. comprises an inlet channel with a spring force-operated valve, which is closed in case of overpressure in the chamber. Without the use of the loading portion in the piston means, this separate valve would be superfluous. In the pump design according to the invention, the parts of the pump have been optimized for working forces. The inside diameter of the pump is over the main part of the pump chamber length larger than that of existing pumps. Consequently, the inlet volume is higher, even though the volume of the remaining part of the chamber is lower than that of existing pumps. This ensures that the pump can pump quicker than existing pumps, while the maximum operating force required is significantly reduced and lower than the level reported by consumers to be comfortable. The length of the chamber can be reduced, so that the pump becomes practical, even for women and teenagers. The volume of a stroke is still higher than that of existing pumps.

FIG. 3A shows a piston pump with a pressurizing chamber 1 with portions of different areas of its transversal cross-sections of wall sections 2,3,4 and 5. The piston rod 6. The cap 7 stops the piston means and guides the piston rod 6. The transitions 16,17 and 18 between the section with the walls 2,3,4 and 5. The longitudinal centre axis 19 of the chamber 1. The piston 20 at the beginning and 20' at the end of the pump stroke.

FIG. 3B shows the sealing portion 8 made an elastic material and the loading portion 9, e.g. a spring washer with segments 9.1, 9.2 and 9.3 (other segments not shown) and a support portion 10 of the piston means attached to the piston rod 6 between two portions of locking means 11. The piston rod 6 has an inlet 12 and a valve 13. The angle $\alpha_1$ between the sealing portion 8 of the piston means and the wall 2 of the pressurizing chamber 1. The sealing edge 37.

FIG. 3C shows outlet channel 14 in a means 15 which reduces the volume of the dead room. Angle $\alpha_2$ between the sealing portion 8' of the piston means and the wall 5 of the pressurizing chamber 1. The loading portion 9'.

FIGS. 4A,B,C,D,E,F show details of the second preferred embodiment. The sealing portion of the piston means is made of an elastically deformable material supported by a support means which can rotate around an axis parallel to the center axis of the chamber. The consequence of this movement is that it supports a larger area of the sealing means the higher the pressure is in the chamber. The loading portion for the support portion initiates the movement of the support means. The loading portion in the form of a flat-shaped spring can change dimensions in a direction perpendicular to the centre line of the chamber. The spring becomes more and more stiff the higher the pressure in the chamber. It can also be a spring on the axis where the support means turns around. By decreasing the diameter of the sealing portion it increases its length. This is the case with an elastically deformable material which is only a bit compressable, like e.g. rubber. Therefore the piston rod sticks out of this sealing means at the beginning of a stroke. If other material for the sealing portion is chosen, its length can remain unchanged or can decrease by decreasing its diameter.

FIG. 4A shows a piston pump with a pressurizing chamber 21 with portions of different transversal cross-section areas. The chamber has cooling ribs 22 at the high-pressure side. The chamber can be (injection) moulded. The piston rod 23. The cap 24 guides the said piston rod. The piston 36 at the beginning and 36' at the end of a pump stroke.

FIG. 4B shows the elastically deformable sealing portion 25 which is fastened to the piston rod 23 by means 26 (not drawn). A part 27 of the piston rod 23 is sticking out of the sealing portion 25. Support portion 28 is hanged up on ring 29 which is fastened to the piston rod 23. Support portion 28 can turn around axis 30. Loading portion 31 comprises a spring which is fastened in a hole 32 onto the piston rod 23. The sealing edge 38.

FIG. 4C shows that part 27 of piston rod 23 is almost covered by the elastically deformed sealing means 25', which has now increased its length and decreased its diameter. The sealing edge 38'.

FIG. 4D shows section A-A of FIG. 4B. The loading portion 31 is fastened at one end in the hole 32 of the piston rod 23. The support portion 28 and the ring 29. The support portion is stopped by a stop surface 33 (not drawn). The support portion 28 is guided by the guiding means 34 (not drawn).

FIG. 4E shows section B-B of FIG. 4C. The support means 28 and the loading means 31 are moved towards the piston rod 23. The rib 22.

FIG. 4F shows an alternative for the loading means 31. It comprises springs 35 on each axis 30.

FIGS. 5A,B,C,D,E,F,G,H show details of the third embodiment. It is a variant of the first embodiment. The sealing portion comprises a flexible impervious membrane for gaseous and/or liquid media. This material can change its dimensions in three directions without folds. This sealing portion is mounted in an O-ring which seals to the wall of the chamber. The O-ring is loaded to the wall by a loading means, e.g. a spring in the circumference. The O-ring and spring are further supported by a support means which can rotate around an axle fastened to the piston rod. This support means can be loaded by a spring.

FIG. 5A shows a longitudinal cross-section of a piston pump analog to that of FIG. 3A. The piston 49 at the beginning and 49' at the end of the pump stroke.

FIG. 5B shows a piston means at the beginning of a stroke comprising a sealing means 40: e.g. a stressed skin, that is fastened to a sealing means 41: e.g. an O-ring. This O-ring is loaded by a spring 42 which is positioned on the circumference of the sealing means 41 and sealing means 40. The central axis 39 of the spring 42. The O-ring 41 and/or spring 42 is supported by support means 43 that can rotate on axis 44 which is attached to the piston rod 45 and positioned perpendicular to the central axis 19. It comprises of a certain amount of separate members 43', loaded in compression during the (compression) pump stroke. These are positioned around the circumference of the sealing means 40,41 and the loading means 42, which they support. The support means 43 can be loaded by a spring 46. The angle $\beta_1$ between the wall of the chamber 2 and the support means 43. The piston rod 45 is without an inlet or a valve. A supporting ring and/or loading ring in the form of a spring can be mounted in the O-ring as an alternative for spring 42 (not drawn). The sealing edge 48.

FIG. 5C shows the piston means at the end of the stroke. The sealing means 40', 41' is thicker, than at the beginning of a stroke: 40,41. The spring 46'. The Angle $\beta_2$ between the wall 5 and the support means 43 at the end of a stroke.

FIG. 5D shows section C-C of FIG. 5A with support means 43, axle 44 and bracket 47.

FIG. 5E shows section D-D from FIG. 5A.

FIG. 5F shows the two positions of the piston 118 of FIG. 5G and 118' of FIG. 5H in a chamber.

FIG. 5G shows a piston which is made of a composite of materials. It comprises a skin 110 of elastic impervious material and fibers 111. The fiber architecture results in the dome-form when it is under pressure. This form stabilizes the piston movement. As an alternative the sealing means can comprise a liner, fibers and a cover (not drawn). If the liner is not tight, an impervious skin could be added (not drawn). All materials at the compressed side of the piston comply with the specific environmental demands of the chamber. The skin is mounted in a sealing portion 112. Within the skin and the sealing portion a spring-force ring 113 can be mounted and which can elastically deform in its plane, and which enhances the loading of the ring 114. The sealing edge 117.

FIG. 5H shows the piston of FIG. 5G at the end of a pump stroke. The dome has been compressed into shape 115, if the is still full overpressure. Shape 110' is a result if the overpressure is decreased e.g. after the media has been released.

FIGS. 6A,B,C show details of the fourth embodiment. The piston means comprises a rubber tube which has a reinforcement, e.g. in the form of a textile yard or cord wound around. The neutral angle between the tangent of the reinforcement winding and the centre line of the hose (=so-called braid angle) is mathematically calculated to be 54° 44'. A hose under internal pressure will not change dimensions (length, diameter), assuming no elongation of the reinforcement. In this embodiment, the diameter of the piston means decreases in relation to the decreasing diameter of the cross-section of the chamber at increasing pressures. The braid angle should be wider than neutral. The shape of the main part of the longitudinal cross-section of the pressurizing chamber is approximately a cone shape due to the behavior of the piston means. At the end of the pump stroke, when the compressed medium has been removed from the chamber, the piston means increases its diameter and its length is decreased. The diameter increase is no practical problem. The sealing force from the piston to the wall of the pressurizing chamber ought to increase by increasing pressure. This can e.g. be done by the choice of a braid angle so that the piston diameter decreases a bit less than the decrease in diameter of the transversal cross-section of the chamber. Therefore, the braid angle can also be chosen to be smaller than neutral and/or being neutral. In general, the choice of the braid angle depends entirely on the design specification, and therefore the braid angle can be wider and/or smaller and/or neutral. It is even possible that the braid angle changes from place to place in the piston. Another possibility is that in the same cross-section of the piston several reinforcement layers are present with identical and/or different braid angles. Any type of reinforcement material and/or reinforcement pattern can be used. The place of the reinforcement layer(s) can be anywhere in the longitudinal cross-section of the piston. The amount of linings and/or covers can be more than one. It is also possible that a cover is absent. The piston means can also comprise loading and supporting means, e.g. those showed earlier. In order to be able to adapt to larger changes in the areas of cross-sections of the chamber a bit different construction of the piston means is necessary. The cone comprises now fibers which are under tension. These are coiled together in the top of the cone near the piston rod, and at the open side of the cone at the bottom of the piston rod. These can also be fastened to the piston rod itself. The pattern of the fibers is designed e.g. so that these are under higher tension the higher the pressure is in the chamber of pump where the media is to be compressed. Other patterns are of course possible, just depending on the specification. They deform the skin of the cone, so that it adapt itself to the cross-section of the chamber. The fibers can lie loose on the liner or in loose in channels between a liner and a cover or they can be integrated on one of the two or in both. It is necessary to have a loading means in order to obtain an appropriate sealing to the wall if there is no pressure under the cone yet. The loading member e.g. a spring force member in the form of a ring, a plate etc. can be build in the skin e.g. by inserting in a moulding process. The suspension of the cone on the piston rod is better than of the foregoing embodiments because the piston will now be loaded by tension. Therefore being more in balance and less material is needed. The skin and the cover of the piston can be made of elastically de formable material which comply with the specific environmental conditions, while the fibers can be elastically or stiff, made of an appropriate material, FIG. 6A shows a longitudinal cross-section of a pump with chamber 60. The wall portions 61,62,63,64,65 are both cylindrical 61,65 and cone-shaped 62,63,64. Transitions 66,67,68, 69 between the said portions. The piston 59 at the beginning and 59' at the end of a pump stroke.

FIG. 6B shows piston means 50, a hose with a reinforcement 51. The hose is fastened to the piston rod 6 by clamp 52 or similar. The piston 6 has ribs 56 and 57. Ribs 56 prevent the movement of the piston means 50 relative to the piston rod 6 towards the cap 7, while ribs 57 prevent the movement of the piston means 50 relative to the piston rod 6 away from the cap 7. Other configurations of the fitting are possible (not shown). On the outside of the hose, a protrusion 53 seals against the wall 61 of the chamber 60. Besides the reinforcement 51 the hose comprises lining 55. As an example cover 54 is shown too. The shape of the longitudinal cross section of the piston means is an example. The sealing edge 58.

FIG. 6C shows the piston means at the end of the stroke, where the gaseous and/or liquid medium is under pressure.

The piston means may be designed in such a way that the diameter change only takes place via a radial change (not shown).

Figures 6D, 6E, 6F:
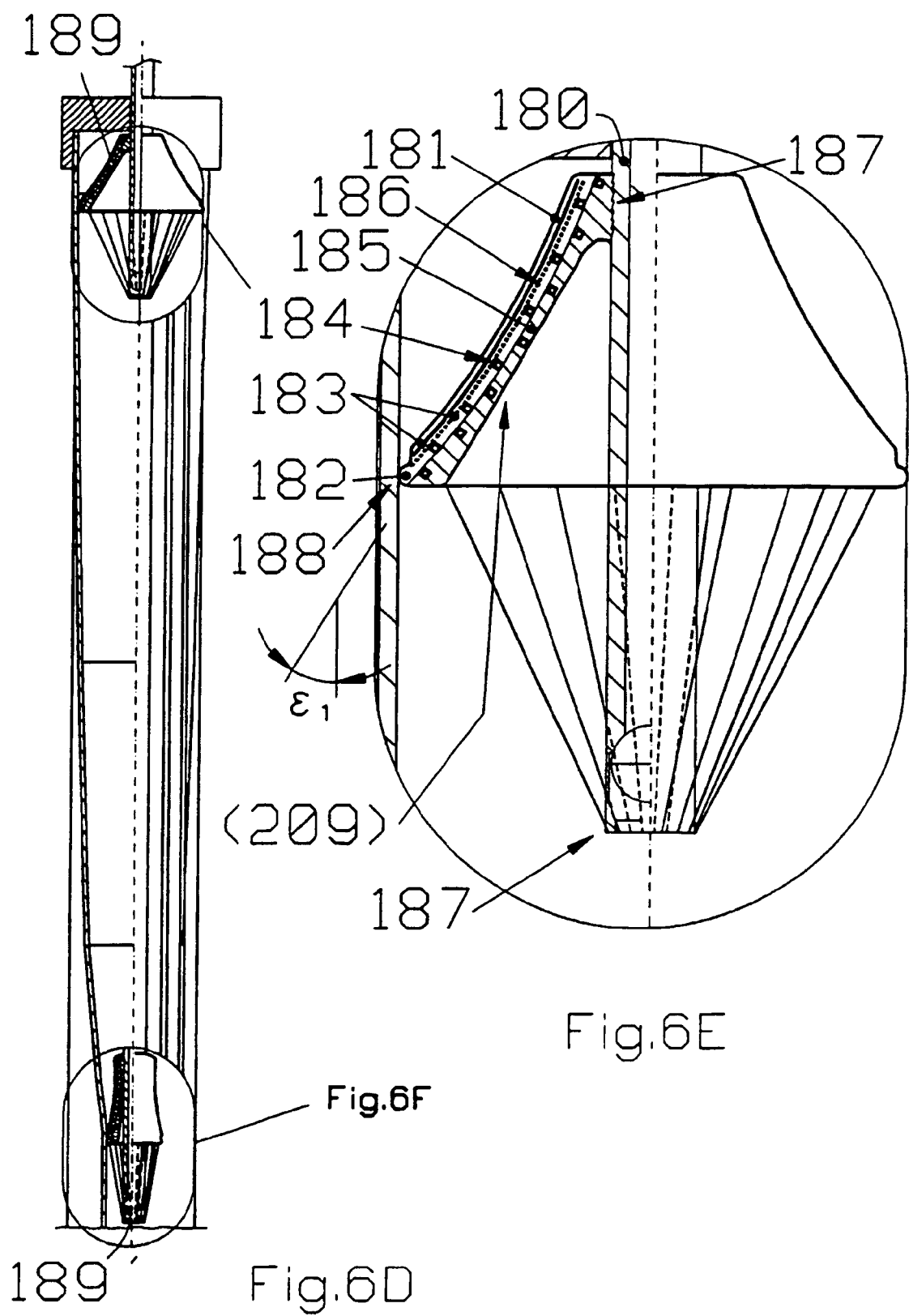
FIG. 6D shows the pressurizing chamber of FIG. 6A and a fifth embodiment of the piston with radially-axially changing dimensions during the stroke—the piston arrangement is shown at the beginning and at the end of a pump stroke.
FIG. 6E shows an enlargement of the piston arrangement of FIG. 6D at the beginning of a stroke.
FIG. 6F shows an enlargement of the piston arrangement of FIG. 6D at the d of a stroke.
Figure 6F:
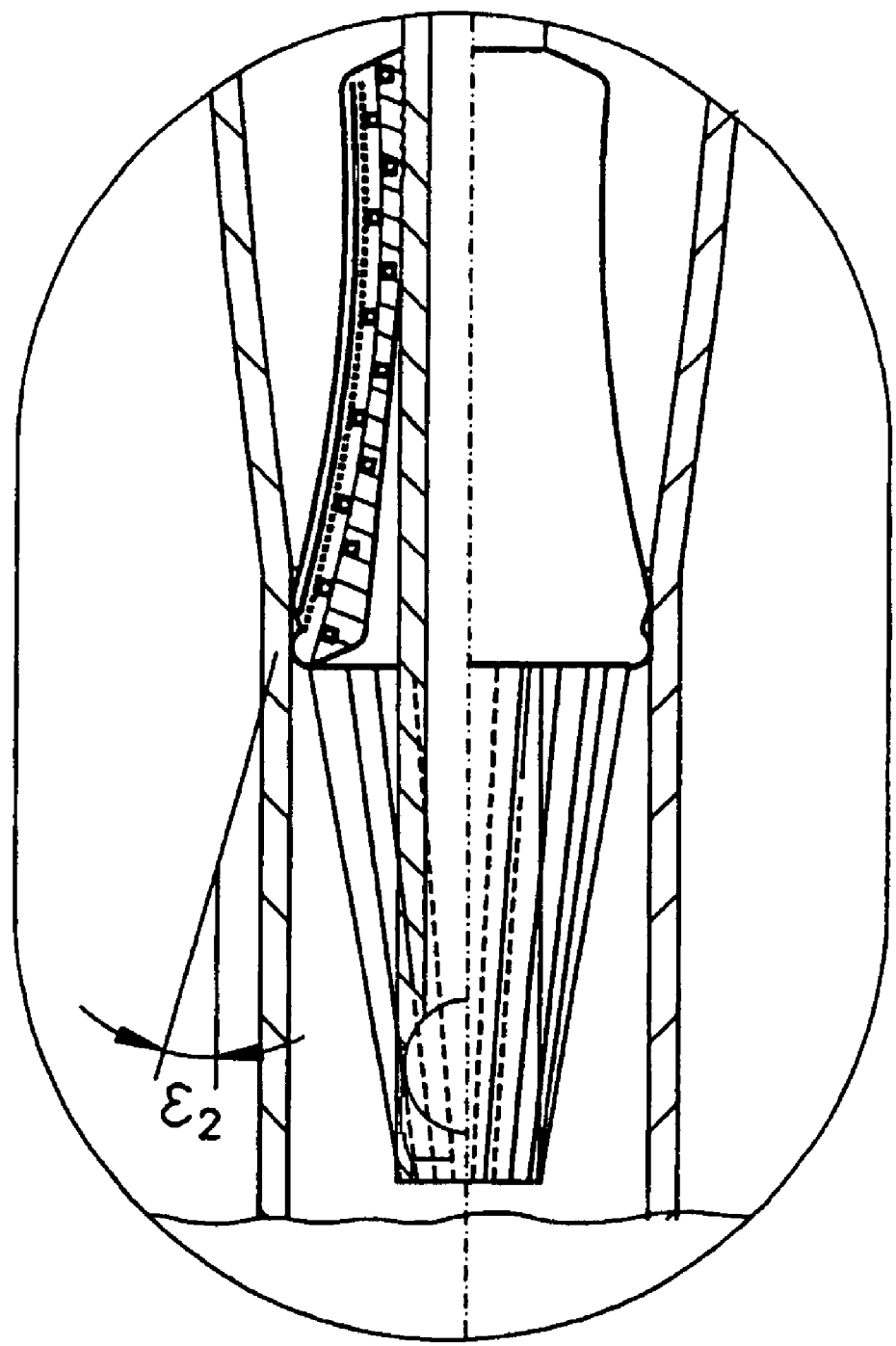

FIG. 6D shows the piston 189 of FIGS. 6E and 189' of FIG. 6F at the beginning and at the end respectively of a pump stroke in a chamber of FIG. 6A.

FIG. 6E shows a piston means which has approximately the general shape of a cone with top angle $\frac{1}{2}\epsilon_1$. It is shown when there is no overpressure at the side of the chamber. It is mounted in its top on a piston rod 180. The cone is open at the pressurized side of the piston. The cover 181 comprises a sealing portion shown as a protrusion 182 with a sealing edge 188 and an inserted spring force member 183, fibers 184 as support means and a liner 185. The member 183 provides a loading to the cover, so that said protrusion 182 seals the wall of the chamber if there is no overpressure at the side of the chamber. The fibers 184 can lie in channels 186, and these are shown situated between the cover 181 and the liner 185. The liner 185 can be impervious—if not, a seperate layer 209 (not shown) at the pressurized side is mounted on, the liner 185. The fibers are mounted in the top 187 of the cone to the piston rod 180 and/or to each other. The same is the case at the bottom end of the piston rod 180.

FIG. 6F shows the piston means at the end of a stroke. The, top angle is now $\frac{1}{2}\epsilon_2$.

FIG. 7A,B,C,D,E show details of the fifth embodiment of the pump, with a piston which is constructed as another composite structure, comprising a basic material which is very elastic in all three dimensions, with a very high degree of relaxation. If it is not tight of itself, it can be made tight with e.g. a flexable membrane on the pressurized side of the piston means. The axial stiffness is accomplished by several integrated stiffeners, which in a transversal cross-section lie in a pattern, which optimally fills this section, while the in-between distance is reduced the smaller the diameter of the transversal cross-sectional section is, which in most cases means the higher the pressure in the pressurizing chamber is. In the longitudinal section of the piston the stiffeners lie in several angles between an axial direction and the direction of the surface of the piston means. The higher the pressure rates are, the more these angles are reduced and come near the axial direction. Now therefore the forces are being transferred to the support means, e.g. a washer, which is connected to the piston rod. The piston means can be mass-produced and is inexpensive. The stiffeners and, if necessary, the sealing means in the form of said flexable membrane, can be injection moulded together with said basic material in one operation. E.g. can the stiffeners be bonded together in the top, which makes handling easier. It is also possible to make the membrane by 'burning' it in said basic material, during or after injection moulding. This is specifically convenient if the basic material is a thermoplast. The hinges should than not be 'burned'.

Figure 7D:
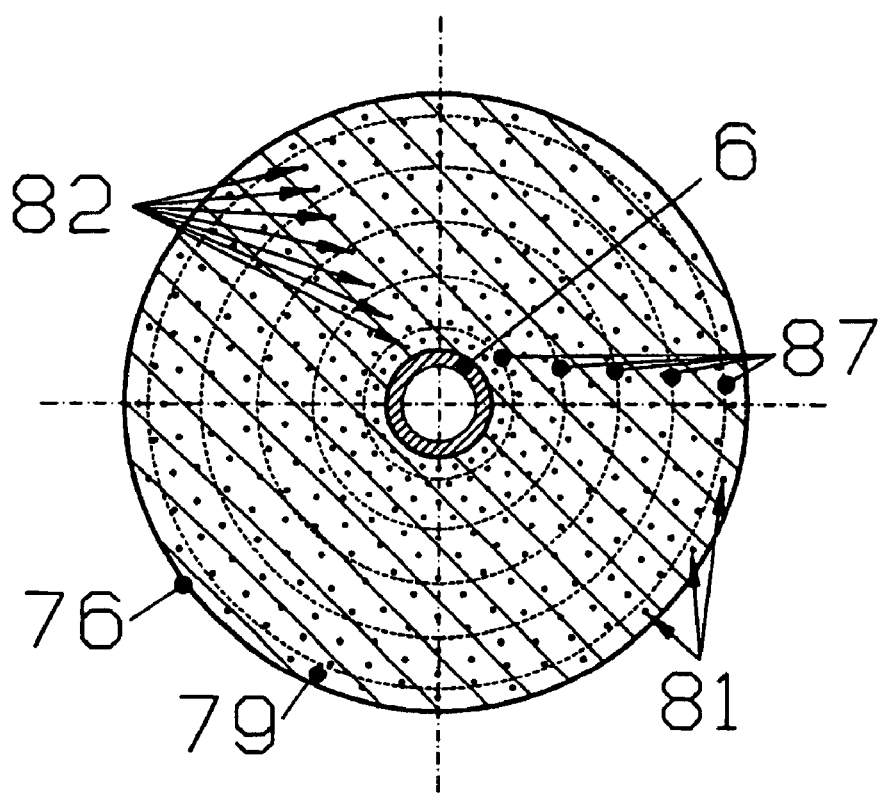
FIG. 7D shows section E-E of FIG. 7B.
Figure 7E:
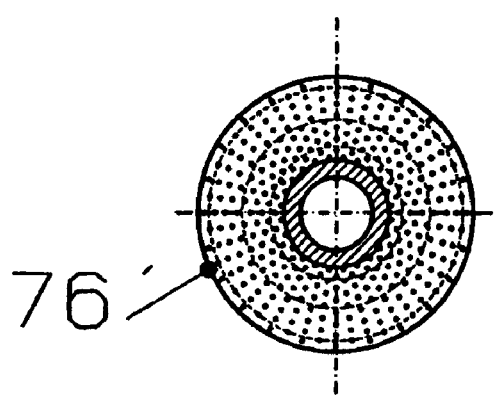
FIG. 7E shows section F-F of FIG. 7C.
Figure 7F:
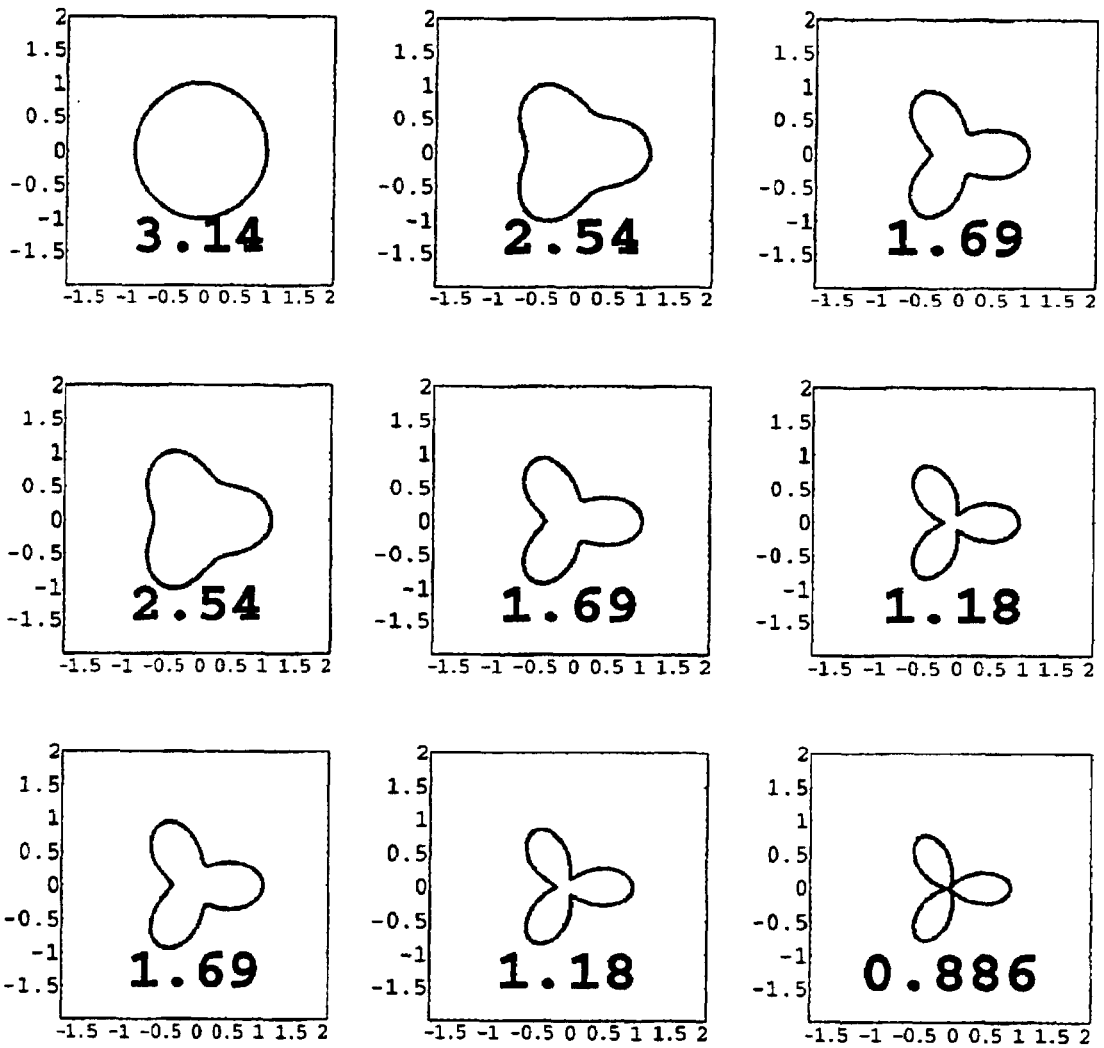
FIG. 7F shows examples of transversal cross-sections made by Fourier Series Expansions of a pressurizing chamber of which the transversal cross-sectional area decreases, while the circumpherical size remains constant.

FIGS. 7F,G,H,I,J,K shows embodiments of the chamber and a sixth embodiment of the piston, fitting to this chamber. The sixth embodiment of the piston is a variant on the one of FIG. 7A,B,C,D,E. If the change of the area of a transversal cross-section of the piston and/or the chamber between two positions in the direction of movement is continuous but still so big that this results in leakages, it is advantageous to minimize the change of the other parameters of the cross-section. This can be illustrated by using e.g. a circular cross-section (fixed shape): the circumference of a circle is $\pi D$, while the area of a circle is $\frac{1}{4}\pi D^2$ (D=diameter of the circle), That is to say, a reduction of D will only give a linear reduction of the circumference and a quadratic reduction of the area. It is even possible to also maintain the circumference and only reduce the area. If also the shape is fixed e.g. of a circle there is a certain minimum area. Advanced numeric calculations where the shape is a parameter can be done by using the below mentioned Fourier Series expansions. The transversal cross-section of the pressurizing chamber and/or the piston can have any form, and this can be defined by at least one curve. The curve is closed and can approximately be defined by two unique modular parametrisation Fourier Series expansions, one for each co-ordinate function:

$$f(x) = \frac{c_0}{2} + \sum_{p=1}^{\infty} c_p \cos(px) + \sum_{p=1}^{\infty} d_p \sin(px) \text{ where}$$

$$c_p = \frac{2}{\pi} \int_0^{\pi} f(x)\cos(px)dx$$

$$d_p = \frac{2}{\pi} \int_0^{\pi} f(x)\sin(px)dx$$

Figure 7J:
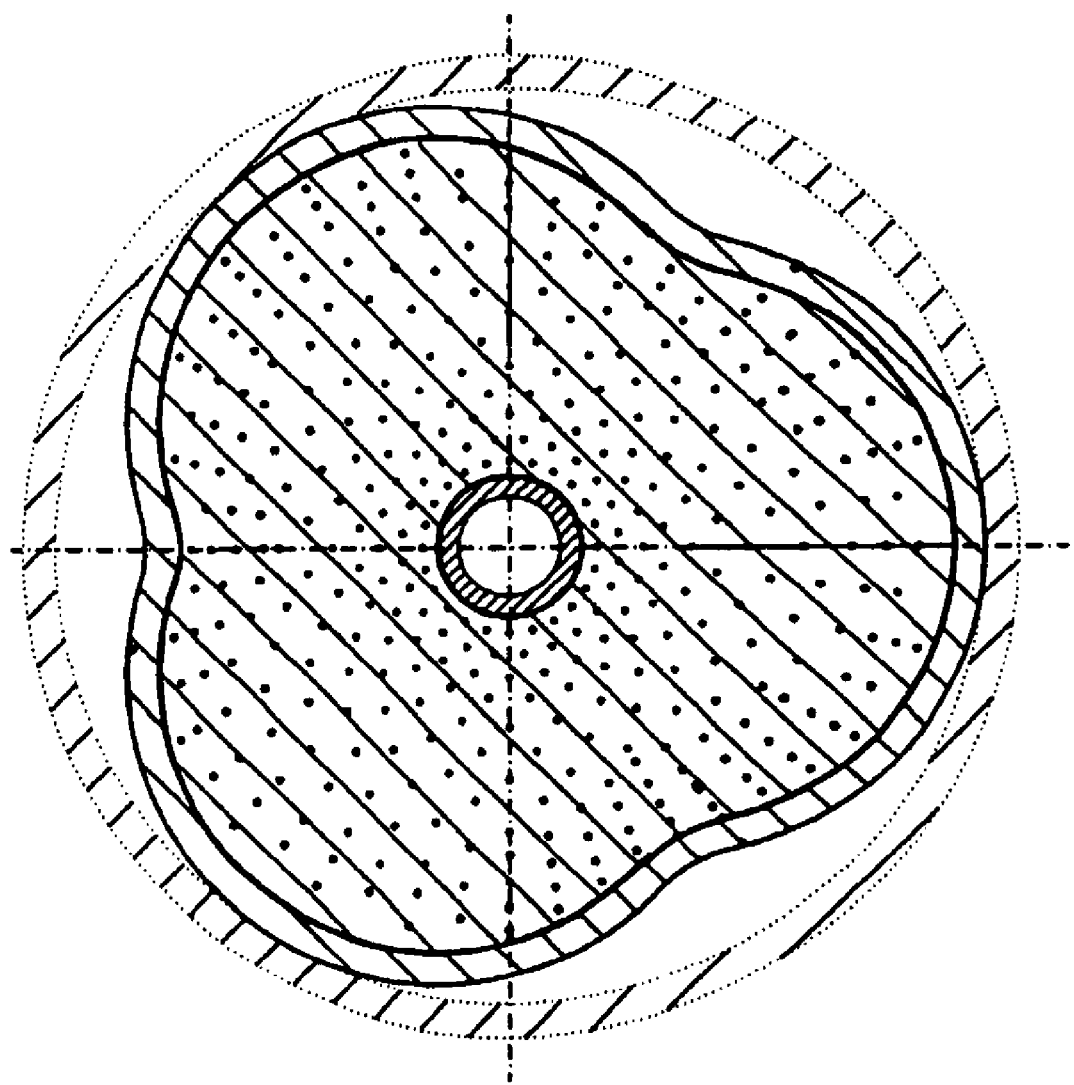
FIG. 7J shows a variant of the piston of FIG. 7B, in section H-H of FIG. 7H.
Figure 7K:
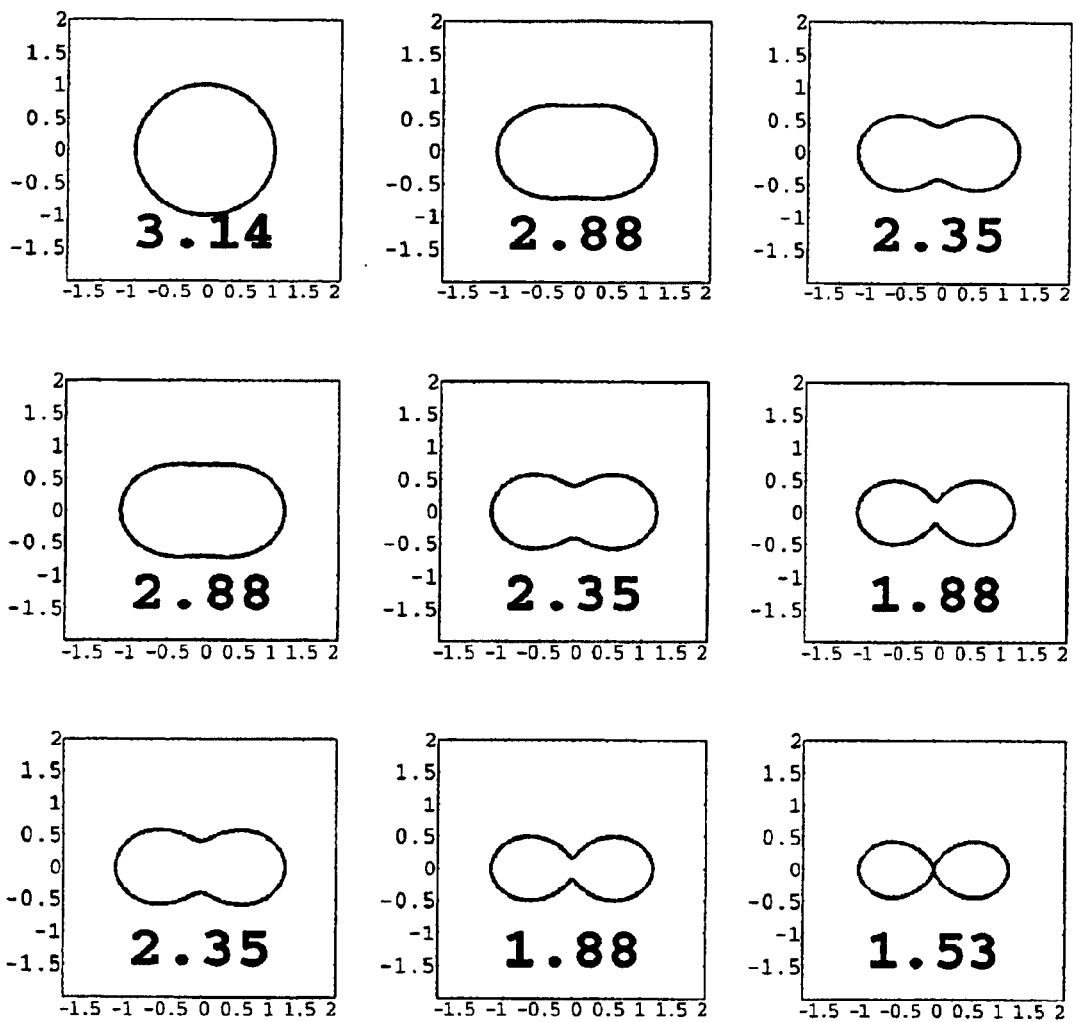
FIG. 7K shows other examples of transversal cross-sections made by Fourier Series Expansions of a pressurizing chamber of which the transversal cross-sectional area decreases, while the circumpherical size remains constant.

$0 \leq x \leq 2\pi$, $x \in R$ $p \geq 0$, $p \in N$ $c_p$=cos-weighted average values of f(x),
$d_p$=sin-weighted average values of f(x),
p=representing the order of trigonometrical fineness FIGS. 7F,7K show examples of said curves by using a set of different parameters in the following formulas. In these examples only two parameters have been used. If more coefficients are used, it is possible to find optimized curves which comply to other important demands as e.g. curved transitions of which the curves have a certain maximum radii and/or e.g. a maximum for the tension in the sealing portion which under given premisses may not exceed a certain maximum.

All kinds of closed curves can be described with this formula, e.g. a C-curve (see PCT/DK97/00223, FIG. 1A). One characteristic of these curves is that when a line is drawn from the mathematical pole which lies in the section plane it will intersect the curve at least one time. The curves are symmetrical towards a line in the section plane, and could also have been generated by the single Fourier Series expansion which follow. A piston or chamber will be more easy to produce when the curve of the transversal cross-section is symmetric with reference to a line which lies in the section plane through the mathematical pole. Such regular curves can approximately be defined by a single Fourier Series expansion:

$$f(x) = \frac{c_0}{2} + \sum_{p=1}^{\infty} c_p \cos(px) \text{ where}$$

$$c_p = \frac{2}{\pi} \int_0^{\pi} f(x)\cos(px)dx$$

$0 \leq x \leq 2\pi$, $x \in R$ $p \geq 0$, $p \in N$ $c_p$=weighted average values of f(x),
p=representing the order of trigonometrical fineness.

When a line is drawn from the mathematical pole it will always intersect the curve only one time.

Specific formed sectors of the cross-section of the chamber and/or the piston can approximately be defined by the following formula:

$$f(x) = \frac{c_0}{2} + \sum_{p=1}^{\infty} c_p \cos(3px)$$

where $$f(x) = r_0 + a \cdot \sqrt[2m]{\sin^2\left(\frac{n}{2}\right)x}$$

$$c_p = \frac{6}{\pi} \int_0^{\frac{\pi}{3}} f(x)\cos(3px)dx$$

$0 \leq x \leq 2\pi$, $x \in R$ $p \geq 0$, $p \in N$ $c_p$=weighted average values of f(x),
p=representing the order of trigonometrical fineness and where this cross-section in polar co-ordinates approximately is represented by the following formula:

$$r = r_0 + a \cdot \sqrt[m]{\left|\sin\left(\frac{n}{2}\varphi\right)\right|}$$

where $r_0 \geq 0$, $a \geq 0$, $m \geq 0$, $m \epsilon R$, $n \geq 0$, $n \epsilon R$, $0 \leq \varphi \leq 2\pi$, and where r = the limit of the "petals" in the circular cross section of the activating pin, $r_0$ = the radius of the circular cross section around the axis of the activating pin, a = the scale factor for the length of the "petals"

$r_{max} = r_0 + a$ m = the parameter for definition of the "petal" width n = the parameter for definition of the number of "petals"

φ = the angle which bounds the curve.

The inlet is placed close to the end of the stroke due to the nature of the sealing portion of the piston means.

FIG. 7A shows a piston pump with a pressurizing chamber 70 in a longitudinal section with a cylindrical portion 71, a transition 72 to a continuous concave curved portion 73, another transition 74 to an almost cylindrical portion 75. The piston means 76 and 76' is shown at the beginning respectively at the end of the pump stroke. At the end of the outlet channel 77 a check valve 78 can be mounted (not shown).

FIG. 7B shows the piston means 76 comprising an elastic material 79 which gives the longitudinal section of the piston at low pressures the form of approximately a cone. The material 79 functions also as a loading means. The bottom comprises a sealing means 80, which can be folded radially—this sealing means 80 is partially also working as a loading means. The main support means comprises of stiffeners 81 and 82, of which the stiffeners 81 mainly support the sealing edge 83 of the piston means to the wall of the pressurizing chamber 70 while the other stiffeners 82 transfer the load from the sealing means 80 and the basic material 79 to the support means 84 e.g. a washer which is itself supported by the piston rod 6. The sealing means 80 is in this position of the piston means 76 still a little bit folded, so that fold 85 will load the sealing edge 83 the more the higher the pressure will be in the chamber 70. Stiffeners 82 are joined together in the top by joint 86. In this position of the piston means 70 the stiffeners 81 and 82 having angles between γ and δ with the central axis 19, where δ is approximately parallel with the central axis 19 of the pressurizing chamber 70. The angle $\phi_1$ between the surface of the piston 76 and the central axis 19.

FIG. 7C shows the piston means 76' at the end of the pump stroke. The sealing means 80 has been folded together, while the elastic material 79 has been squeezed together, resulting in the stiffeners 81,82 are directed approximately parallel with the central axis 19. The angle $\phi_2$ between the surface of the piston means 76' and the central axis 19 is positive, but almost zero. The sealing means 80'.

FIG. 7D shows a transversal cross-section E-E of the piston means 76, showing the basic elastic material 79, stiffeners 81 and 82, folds 87 of the sealing means 80. Piston rod 6.

FIG. 7E shows a transversal cross-section F-F of the piston means 76', showing the basic elastic material 79, stiffeners 81 and 82, folds 87 of the sealing means 80. Clearly shown is that the elastic material 79 is squeezed together.

FIG. 7F shows a series of transversal cross-sections of a chamber where the area decreases in certain steps, while the circumference remains constant—these are defined by two unique modular parametrisation Fourier Series expansions, one for each co-ordinate function. At the top left is the cross-section which is the start cross-section of said series. The set of parameters used is shown at the bottom of the figure. This series show decreasing area's of the transversal cross-section, but it is also possible to increase these area's by remaining the circumference constant.

FIG. 7G shows a longitudinal cross-section of the chamber 162, of which the transversal cross-sectional area changes by remaining circumference along the central axis. The piston 163. The chamber has portions of different cross-sectional area's of its transversal cross-section of wall sections 155, 156,157,158. The transitions 159,160,161 between said wall sections. Shown are cross-sections G-G, H-H and I-I. Cross-section, G-G has a circelround cross-section, while cross-section H-H 152 have approximately an area between 90-70% of the one of cross-section G-G.

FIG. 7H shows transversal cross-section H-H 152 of FIG. 7G and in dotted lines as a comparison cross-section G-G 150. Cross-section H-H has approximately an area between 90-70% of that of cross-section G-G. The transition 151, which is made smooth. Also shown is the smallest part of the chamber, which has approximately 50% of the cross-sectional area of cross-section G-G, FIG. 7I shows a transversal cross-section I-I of FIG. 7G and in dotted lines as a comparison cross-section G-G. The cross-section I-I has approximately an area of 70% of that of cross-section G-G. The transition 153 is made smooth. Also shown is the smallest part of the chamber.

FIG. 7J shows a variant of the piston of FIG. 7A-C in cross-section H-H from FIG. 7G. The piston is now made of elastic material which is also impervious so that a seperate sealing means is not necessary.

FIG. 7K shows a series of transversal cross-sections of a chamber where the area decreases in certain steps, while the circumference remains constant—these are defined by two unique modular parametrisation Fourier Series expansions, one for each co-ordinate function. At the top left is the cross-section which is the start cross-section of said series. The set of parameters used is shown at the bottom of the figure. This series show decreasing area's of the transversal cross-section, but it is also possible to increase these area's by remaining the circumference constant.

Figures 8A, 8B, 8C:
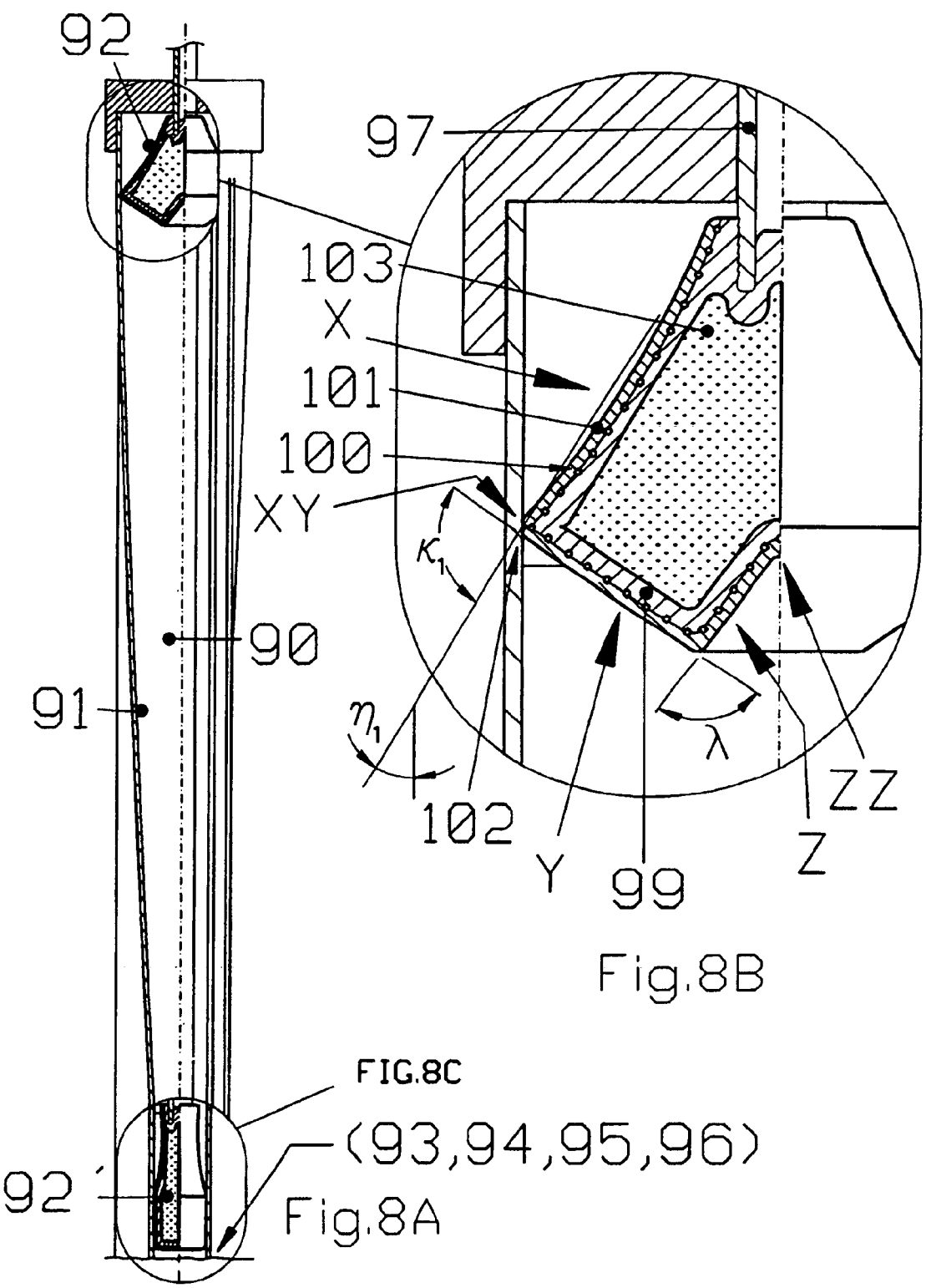
FIG. 8A shows a longitudinal cross-section of a pump comprising a convex portion of the wall of the pressurizing chamber with fixed dimensions and a seventh embodiment of the piston with radially-axially changing dimensions during the stroke—the piston arrangement is shown at the beginning and at the end of a pump stroke.
FIG. 8B shows an enlargement of the piston arrangement of FIG. 5A at the beginning of a stroke.
FIG. 8C shows an enlargement of the piston arrangement of FIG. 5A at the end of a stroke.
Figure 8C:
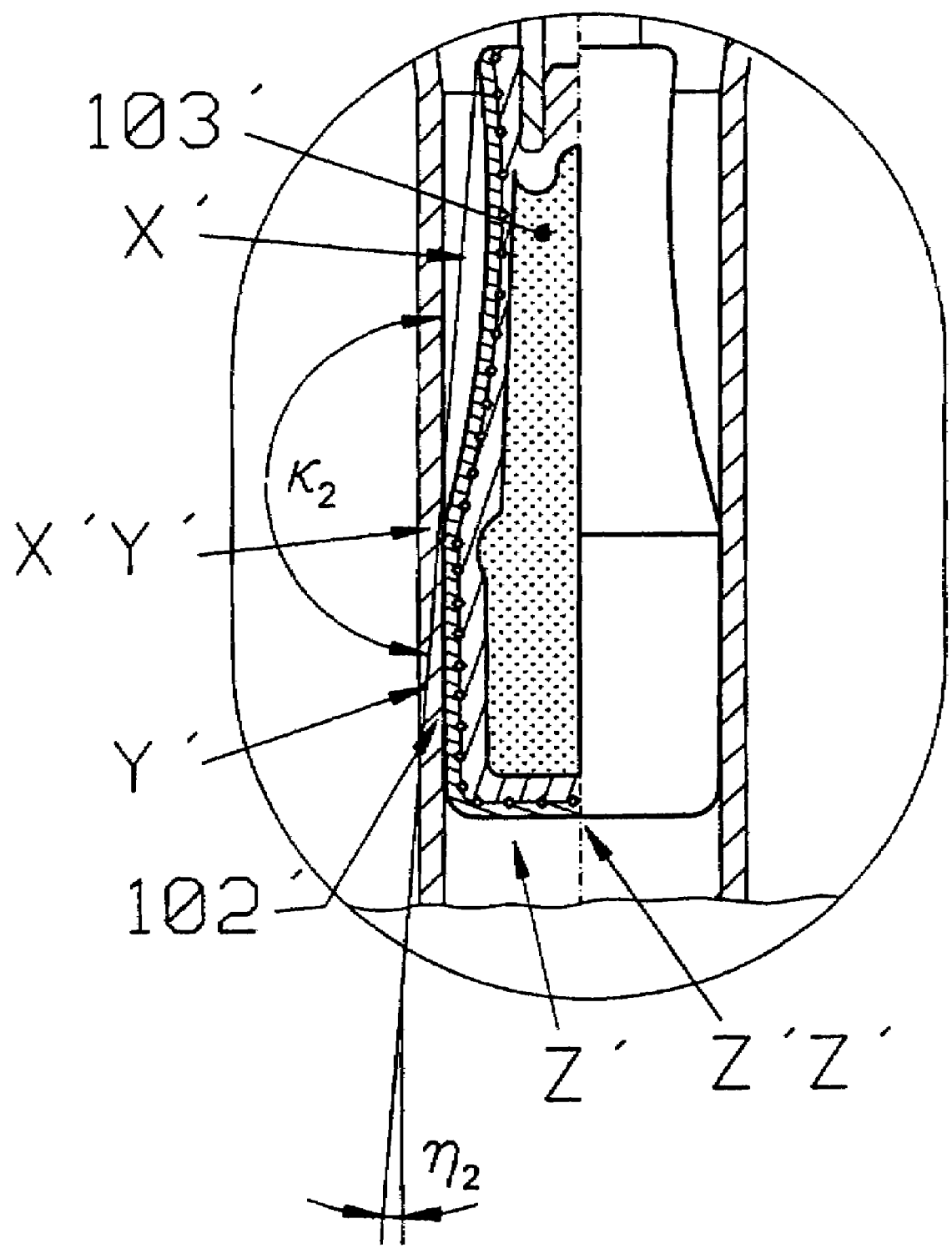

FIG. 8A,B,C show a seventh embodiment of the pump, with a piston means which is constructed as another composite structure, comprising a compressable medium as e.g. a gaseous medium like for example air (also is possible: only a non-compressible medium as e.g. a liquid medium like water or a combination of compressable and a non-compressible medium) within a closed chamber which is constructed as e.g. a reinforced hose. It may be possible that the lining, reinforcement and cover at the pressurized side of the piston means is different from that of the non-pressurized side—here the skin can be built up as a pre-formed shaped skin, holding this shape during the pump stroke. It is also possible that the skin is made of two or more parts, which itself are pre-formed shaped, one at the non-pressurized side of the piston means, the other on the pressurized side (please see FIG. 8B part X resp. parts Y+Z). During the pump stroke the two parts hinge in each other (please see FIG. 8B XY and ZZ). The adaptation of the sealing edge to the chamber in the transversal cross-section results in a change of the cross-section of the piston at its sealing edge, and this results in a change of the volume inside the piston. This gives a change in the pressure of the compressable medium and results in a changed sealing force. Moreover, the compressable medium functions as a support portion as it transfers the load on the piston to the piston rod.

FIG. 8A shows a longitudinal section of the pressurizing chamber 90, comprising a continuous convex curve 91, with the piston 92 at the beginning of the pump stroke, and 92' at the end hereof. The high pressure part of the chamber 90 comprises an outlet channel 93 and an inlet channel 94 both with a check valve 95 and 96, respectively (not shown). For low pressure purposes the check valve 95 can be removed.

FIG. 8B shows piston 92 which is vulcanised directly on the piston rod 97, comprising a compressible medium 103 within a lining 99, a reinforcement 100 and a cover 101. Part X of the skin 99,100, 101 is pre-shaped as it is with the parts Y and Z at the pressurized part of the piston means 92. A hinge XY is shown between part X and part Y of the skin. Part X has an average angle $\eta_1$ with the central axis 19 of the pressurized chamber 90. Part Y and Z are connected to each other and have an in-between angle $\kappa_1$, which is chosen so that the forces will be directed mainly to the piston rod. Angle $\lambda$ between parts Y' and Z', and chosen so that the higher the force in the chamber, the more this part is perpendicular to the central axis. Hinge ZZ between the half of part Z. The sealing edge 102.

FIG. 8C shows the piston at the end of a stroke. Part X' of the skin has now an angle $\eta_2$ with the central axis, while parts X' and Y' has an in-between angle $\kappa_2$, and an approximately unchanged angle $\lambda$ between Y' and Z'. The angle between the halves of part Z is approximately zero. The sealing edge 102' and compressed medium 103'.

FIG. 9A,B,C,D show details of a combination of a pressurizing chamber with fixed dimensions and an eight embodiment of a piston which can change its dimensions. The piston is an inflatable body which fills a transversal cross-section of the chamber. During the stroke it is constantly changing its dimensions on and nearby the sealing edge. The material is a composite of an elastically deformable liner and a support means like e.g. fibers (e.g. glass, boron, carbon or aramid), fabric, filatement or the like. Depending on the fiber architecture and the total resulting loading on the piston—the piston is shown having a bit internal overpressure—it can result in approximately the form of a sphere or approximately an elleptical curve ('rugby ball'-like form) or any shape in between, and also other shapes. A decrease of the transversal cross-sectional area of e.g. the chamber causes a decrease in the size of the inflatable body in that direction and a 3-dimensional reduction is possible due to the fiber architecture, which is based on the 'trellis-effect' where fibers are shearing layerwise independently from each other. The cover is also made of an elastically deformable material, suitable for the specific environmental conditions in the chamber. If the liner nor the cover is impervious it is possible to use a separate bladder inside the body, as the body contains an gaseous and/or liquid media. The support means as e.g. fibers can only give strength themselves if the pressure inside the body is bigger than outside, because these are than in tension. This pressure condition is preferrable to obtain a suitable sealing and life time. As the pressure in the chamber can change constantly, the pressure inside the body should do the same and be a bit higher, or should always be higher at any point of the pump stroke by remaining constant. The last solution can only be used for low pressures as otherwise the piston would jam in the chamber. For higher pressures in the chamber an arrangement is necessary so that the internal pressure vary accordingly the variations of the pressure in the chamber + should be a bit higher. This can be achieved by several different arrangements—loading regulating means—which are based on the principles to change the volume and/or pressure of a medium inside the piston and/or to change the temperature of the medium inside—other principles are possible too, as e.g. the right choice of the material of the skin of the piston, e.g. a specific rubber type, where it is E-module which defines the deformability, or the right choice of the relative amount of the compressable part of the volume inside the inflatable body, and its compressability. Here an non-compressable medium is used inside the piston. By a change in the size of the transversal cross-sectional area at the sealing edge the volume of the piston changes, because the size of the piston in a direction of the movement is constant. This change causes the non-compressable medium to flow to or from the a spring-force operated piston inside the hollow piston rod. It is also possible that said spring-force operated piston is situated elsewhere. The combination of the pressure caused by the change of the volume of the piston and the change in the pressure due to said spring-force results in a certain sealing force. The said spring-force works as a fine-tuning for the sealing force. An improved load regulation can be achieved by exchanging the non-compressable medium by a certain combination of a compressable and a non-compressable medium, where the compressable medium works as a load regulating means. A further improvement is when said spring is exchanged by the operation force of the piston of the chamber, as it makes the retraction of the piston easier, due to a lower sealing force and a lower friction. A temperature raise of a medium inside the piston can be achieved when specifically a medium is chosen which can quickly be warmed up.

Figure 9C:
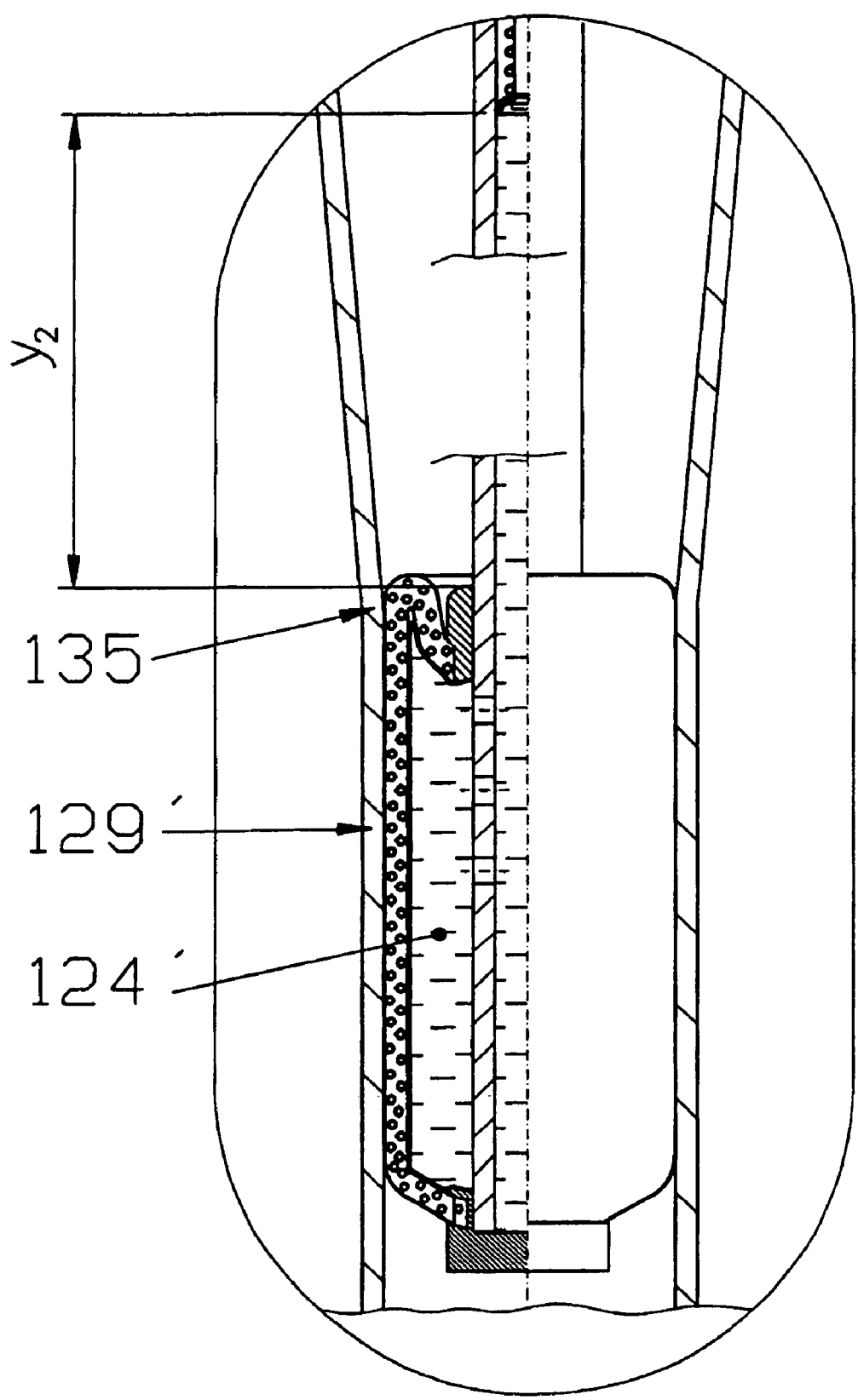
FIG. 9C shows an enlargement of the piston arrangement of FIG. 9A at the end of a stroke.

FIG. 9A shows the longitudinal cross-section of the pressurizing chamber of FIG. 8A with the piston 146 of FIG. 9B at the beginning of a stroke, and of FIG. 9C at the end 146' of a stroke.

FIG. 9B shows a piston 146 with an inflatable body having a wall comprising fibers 130 which have a pattern, so that the inflated body becomes a sphere. Cover 131 and liner 132. An impervious bladder 133 is shown inside the sphere. The sphere is directly mounted on the piston rod 120. It is locked at cine end by a cap 121, and at the other end by cap 122. The hollow channel 125 of the piston rod 120 has a hole 123 in its side inside the sphere, so that the loading means being e.g. an incompressible medium 124 contained within the sphere can flow freely to and from the channel 125 of the piston rod 10. The other end of the channel 125 is closed by a movable piston 126 which is loaded by a spring 127. The spring is mounted on a piston rod 128. The spring 127 tunes the pressure in within the sphere and the sealing force. The sealing surface 129 is approximately in a line contact with the of the adjacent wall of the chamber. The fibers are only shown schematically (in all the drawings of this application).

FIG. 9C shows the piston of FIG. 9B at the end of a stroke where the area of the cross-section is smallest. The sphere has now a much bigger sealing surface 134 which is uniform with the adjacent walls of the chamber. The piston 126 has moved in relation to its position shown in FIG. 9B, as the non-compressible medium 124' has been squeezed out of the distorted sphere. In order to minimize the friction force it is possible that the cover at the sealing surface has ribs (not shown) or can have a low-frictional coating (as well as the wall of the chamber—not shown). As none of the caps 121 and 122 can move along the piston rod 120, the trellis effect only can a part of the material surplus of the skin. The rest shows as a 'shoulder' 135 which reduces the life time considerably, while it increases the friction as well. The sealing edge 129'.

Figure 9D:
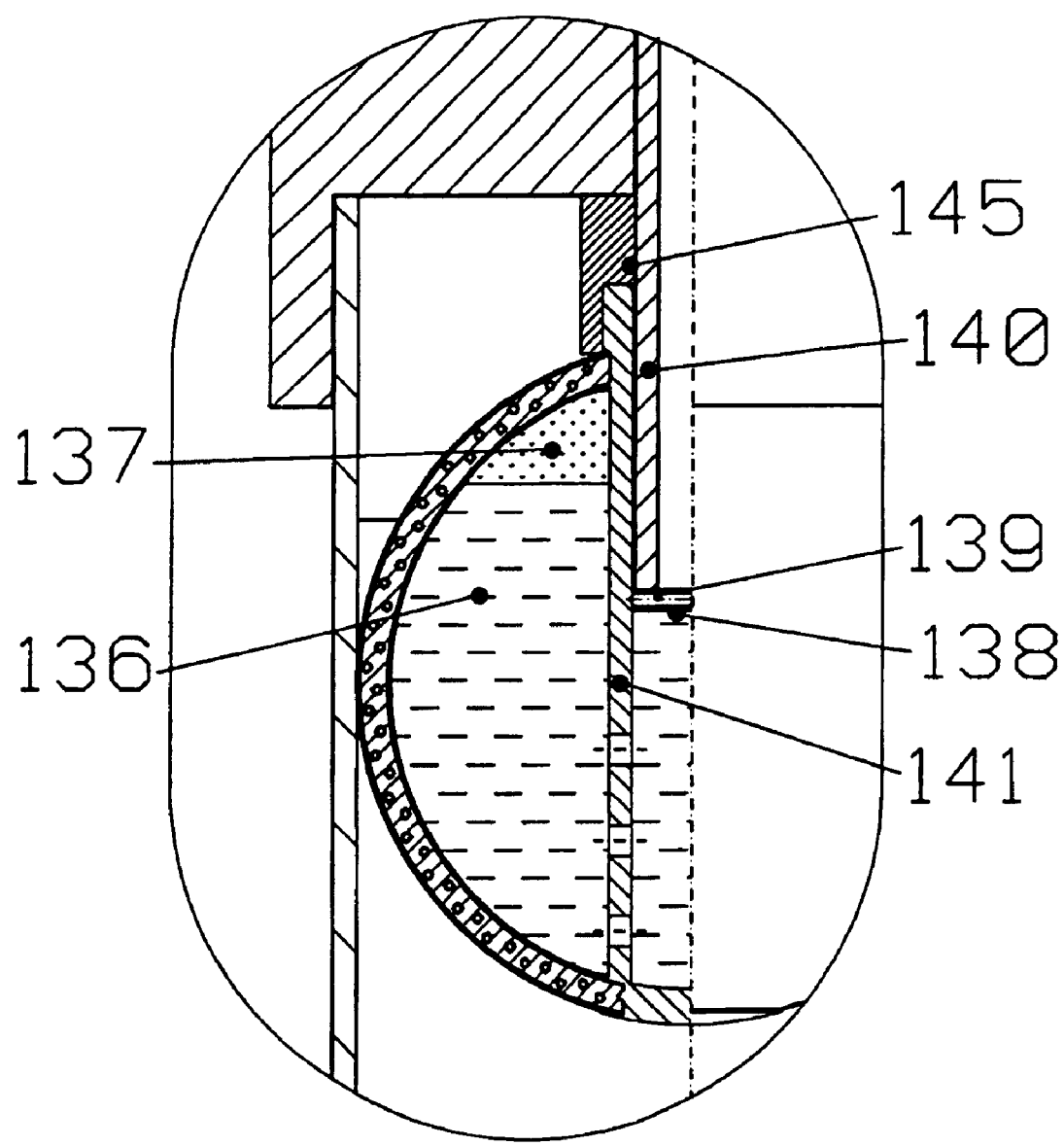
FIG. 9D shows the piston of FIG. 9B with a different tuning arrangement.

FIG. 9D shows an improved tuning of the sealing force, by having inside the sphere an incompressible medium 136 and a compressible medium 137. The pressure of the media is regulated by a piston 138 with a sealing ring 139 and a piston rod 140 which is directly connected to the operating force. The piston 138 can slide in the cylinder 141 of the sphere. The stop 145 secures the sphere on the piston rod 140.

FIGS. 10A,B,C show an improved piston where the surplus of the skin by small cross-sections of the chamber can be released which means an improved life time and less friction. This method concerns the fact that a suspension of the piston on the piston rod can translate and/or rotate over the piston rod to a position farther from the side of the piston where there is the biggest pressure in the chamber. A spring between the movable cap and a stop on the piston rod functions as another loading regulating means.

FIG. 10A shows a longitudinal cross-section of the chamber 169 of a pump according to the invention with two positions of the piston 168 respectively 168'.

FIG. 10B shows a piston with an inflatable skin with a fibers 171 in at least two layers with a fiber architecture which result in approximately a sphere—ellipsoide, when inflated. Inside the piston can be an impervious layer 172, if the skin is not tight. The media is is a combination of a compressible medium 173, e.g. air, and an incompressable medium 174, e.g. water. The skin 171 is mounted at the end of the piston rod in cap 175 which is fastened to the piston rod 176. The other end of the skin is hingend fastened in a movable cap 177 which can glide over the piston rod 176. The cap 177 is pressed towards the pressurized part of the chamber 169 by a spring 178 which is squeezed at the other end towards a washer 179 which is fastened to the piston rod 176. The sealing edge 167.

Figure 10C:
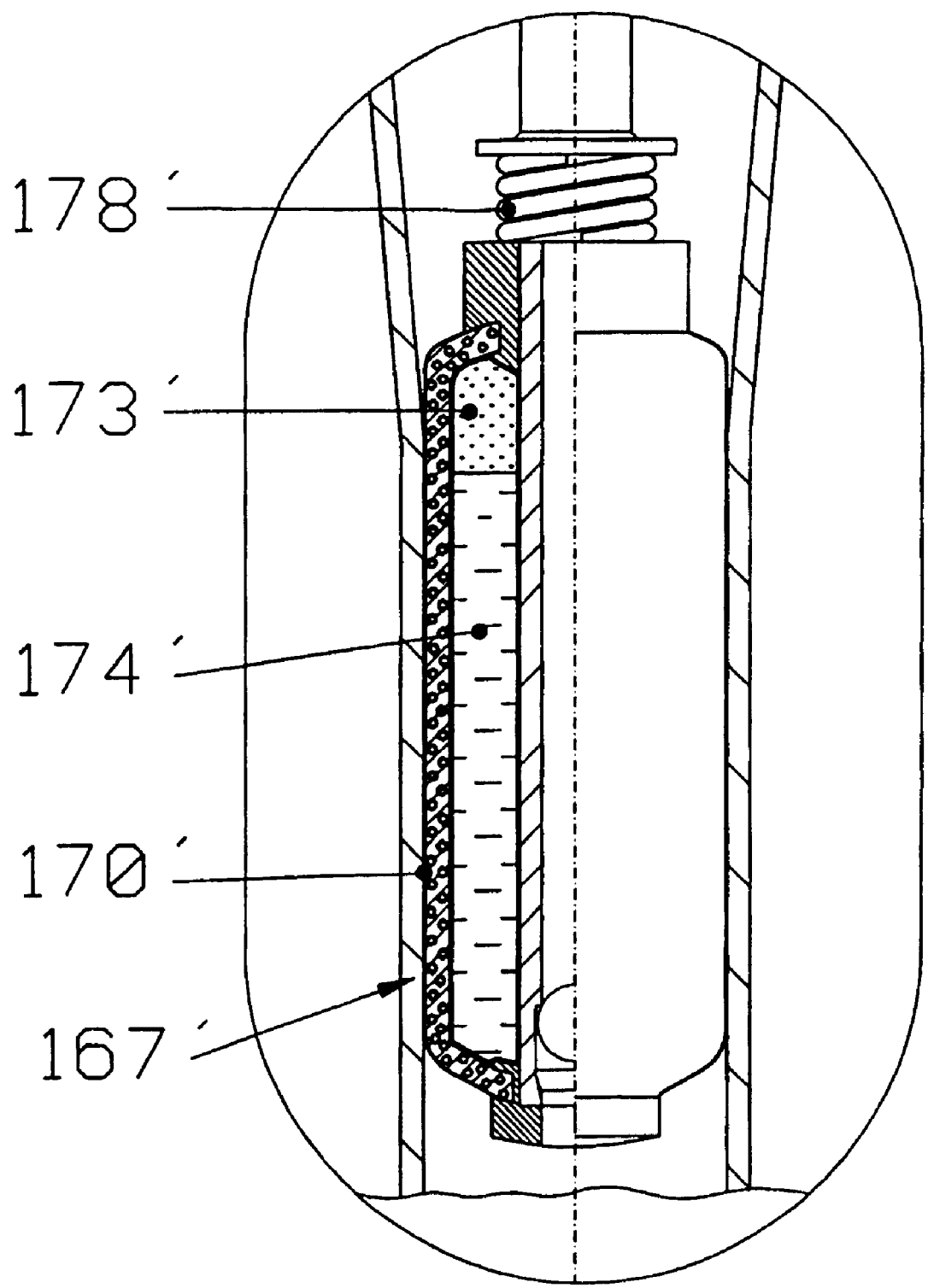
FIG. 10C shows an enlargement of the piston of FIG. 10A at the end of a stroke.

FIG. 10C shows the piston of FIG. 10B at the end of the pump stroke. The spring 178' is compressed. The same is valid for the incompressable medium 174' and the compressible medium 173'. The skin 170' is deformed, and has now a big sealing surface 167'.

Figures 11A, 11B, 11C:
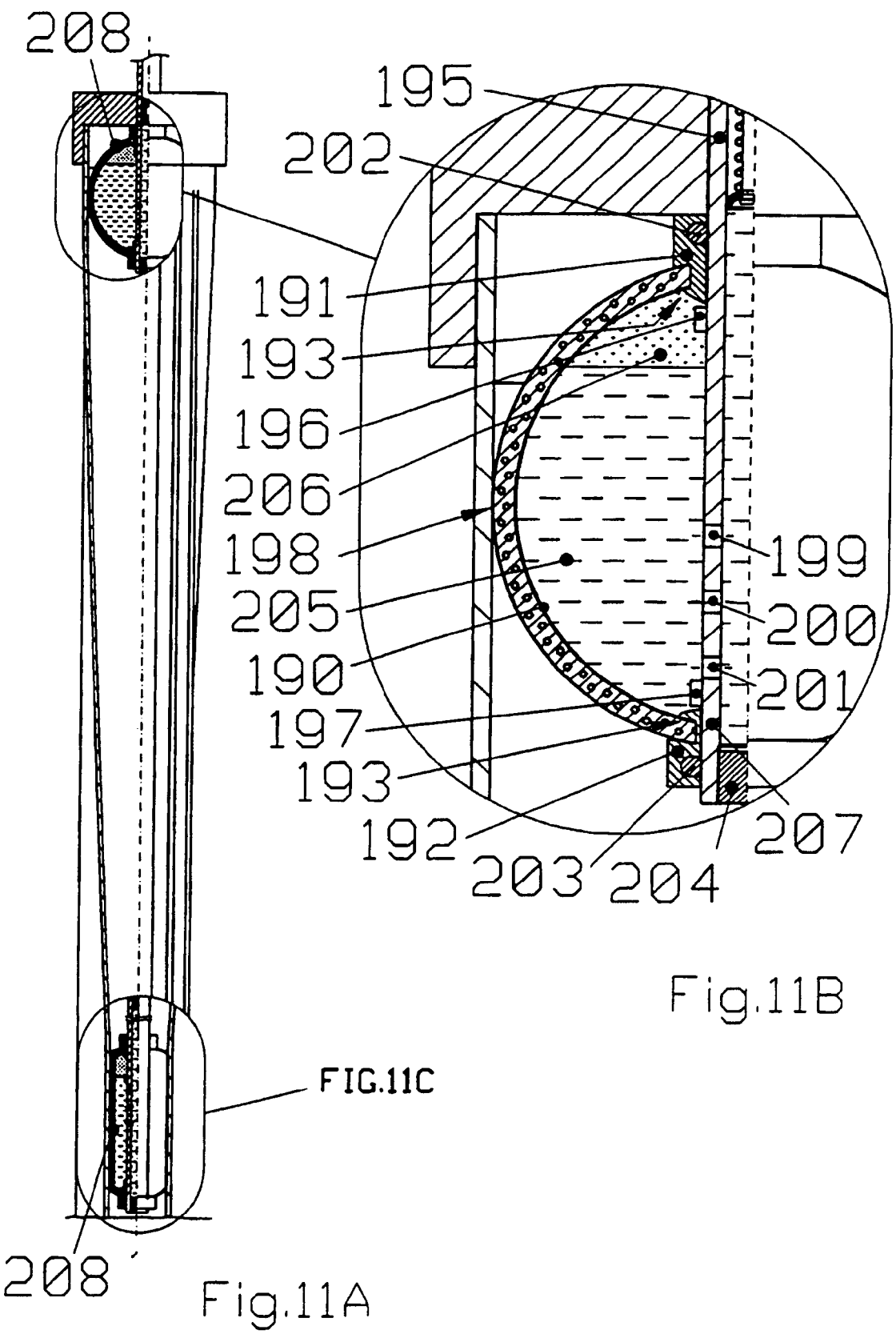
FIG. 11A shows a longitudinal cross-section of a pump with fixed different areas of the transversal cross-sections of the pressurizing chamber and an tenth embodiment of the piston with radially-axially changing dimensions during the stroke—the piston arrangement is shown at the beginning and at the end of a pump stroke.
FIG. 11B shows an enlargement of the piston of FIG. 11A at the beginning of a stroke.
FIG. 11C shows an enlargement of the piston of FIG. 11A at the end of a stroke.
Figure 11C:
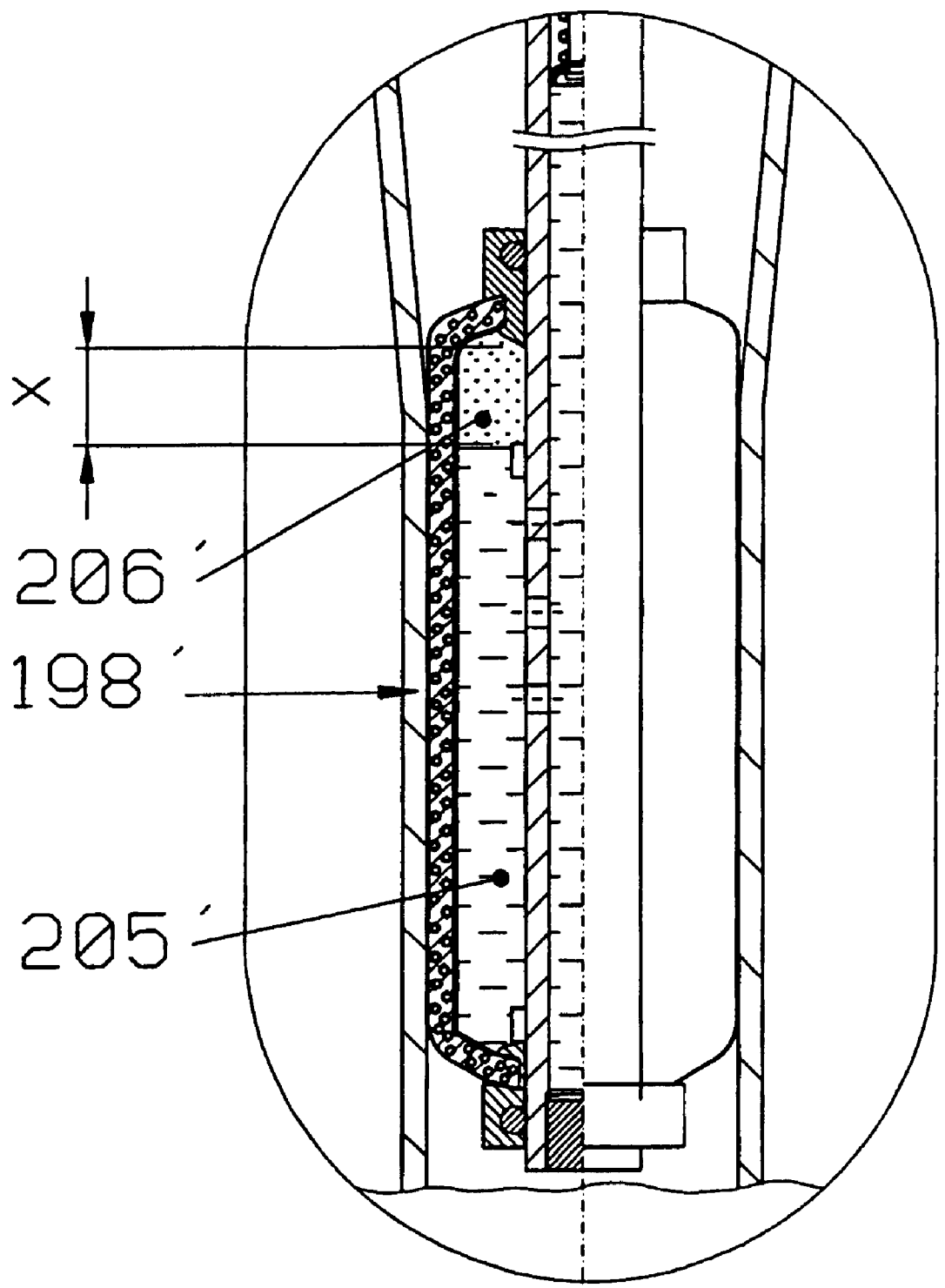

FIGS. 11A,B,C show a piston which has at both of its ends in the direction of movement on the piston rod a movable cap which takes the surplus of material away. This is an improvement for a piston in a one-way piston pump, but specifically is it possible now to use the piston in a dual operating pump where any stroke, also the retraction stroke, is a pump stroke. The movement of the skin during the operation is indirectly limited due to stops on the piston rod. These are positioned so that the pressure of a medium in the chamber cannot strip the piston from the piston rod.

FIG. 11A shows a longitudinal cross-section of the chamber with an improved piston 208 at the beginning and at the end (208') of a stroke.

FIG. 11B shows a ninth embodiment of the piston 208. The skin of the sphere is comparable with the one of FIG. 10. An impervious layer 190 inside is now tightly squeezed in the cap 191 in the top and the cap 192 in the bottom. Details of said caps are not shown and all kinds of assembling methods may be used. Both caps 191,192 can translate and/or rotate over the piston rod 195. This can be done by various methods as e.g. different types of bearings which are not shown. The cap 191 in the top can only move upwards because of the existence of the stop 196 inside the piston. The cap 192 in the bottom can only move downstairs because the stop 197 prevent a movement upwards. The 'tuning' of the sealing force comprises a combination of an incompressable medium 205 and a compressible medium 206 inside the sphere, a spring-force operated piston 126 inside the piston rod 195. The media can freely flow through the wall 207 of the piston rod through holes 199,200,201. O-rings or the like 202, 203 in said cap in the top and in said cap in the bottom, respectively seal the caps 191,192 to the piston rod. The cap 204, showed as a screwed assembly at the end of the piston rod 195 tightens said piston rod. Comparable stops can be positioned elsewhere on the piston rod, depending on the demanded movement of the skin.

FIG. 11C shows the piston of FIG. 11B at the end of a pump stroke. The cap 191 in the top is moved over a distance x from the stop 196 while the bottom cap 192 is pressed against the stop 197. The compressable medium 206' and the non-compressable medium 205'.

FIGS. 12A,B,C show an improved piston in relation to the earlier one's. The improvements have to do with a better tuning of the sealing force by the loading regulating means, a reduction of friction by a smaller sealing contact surface, specifically by smaller cross-sectional area's. The improved tuning concerns the fact that the pressure inside the piston now directly is influenced by the pressure in the chamber due to a pair of pistons on the same piston rod and which is by that independant of the existance of an operation force on the piston rod. This can be specifically advantageous during a stop in the pump stroke, if the operation force would change, e.g. increase, because the sealing force remains constant and no loss of sealing occurs. At the end of a pump stroke when the pressure in the chamber is decreased, the retraction will be more easy due to lower friction forces. In the case of a dual operating pump, the loading regulating means can be influenced by both sides of the piston, e.g. by a double arrangement of this load regulating means (not shown). The showed arrangement of the pistons is complying with a specification: e.g. an increase of the pressure in the chamber will give an increase of the pressure in the piston. Other specifications can result in other arrangements (please see on page 27,28). The relation can be designed so that the increase can be different than only a lineair relation. The construction is a pair of pistons which are connected by a piston rod. The pistons can have an equal area, different size and/or a changing area. Due to a specific fiber architecture and the total resulting loading—it is shown with a bit internal overpressure—the shape of the piston in a longitudinal cross-section is a rhomboid figure. Two of its corners in this section work as a sealing surface, which gives a reduced contact area by smaller transversals cross-sections of the chamber. The size of the contact surface can still be increased by the existance of a ribbed outer surface of the skin of the piston. The wall of the chamber and/or the outside of the piston can have a coating as e.g. nylon or have been made of a low-friction material.

FIG. 12A shows a longitudinal cross-section of a piston chamber combination with a tenth embodiment of a piston 222 at the beginning and at the end (222') of a stroke in a chamber 216.

FIG. 12B shows a piston of which the main construction is described in FIGS. 11B and 11C. The skin comprises at the outside ribs 210. The skin and the impervious layer at the inside are squeezed at the top between an inter part 211 and an outer part 212, which are screwed together. At the bottom the similar construction exists with the inner part 213 and the outer part 214. Inside the piston there is a compressable medium 215 and a non compressable medium 219. The pressure inside the piston is tuned by a piston arrangement which is directly activated by the pressure of the chamber 216. The piston 148 in the bottom which is connected to the pressurizing chamber 216 is mounted on a piston rod 217 while at the other side another piston 149 is mounted and which is connected to a medium of the piston 222. The piston rod 217 is guided by a slide bearing 218—other bearing types can also be used (not shown). The pistons on both sides of the piston rod 217 can have different diameters—it is even possible that the cylinder 221 these are moving in, are exchanged by two chambers, which can be of a type according this invention—by that, the piston and/or pistons are also of a type according this invention. The sealing edge 226. The piston rod 224. Distance $d_1$ between the piston 148 and orifice 223.

Figure 12C:
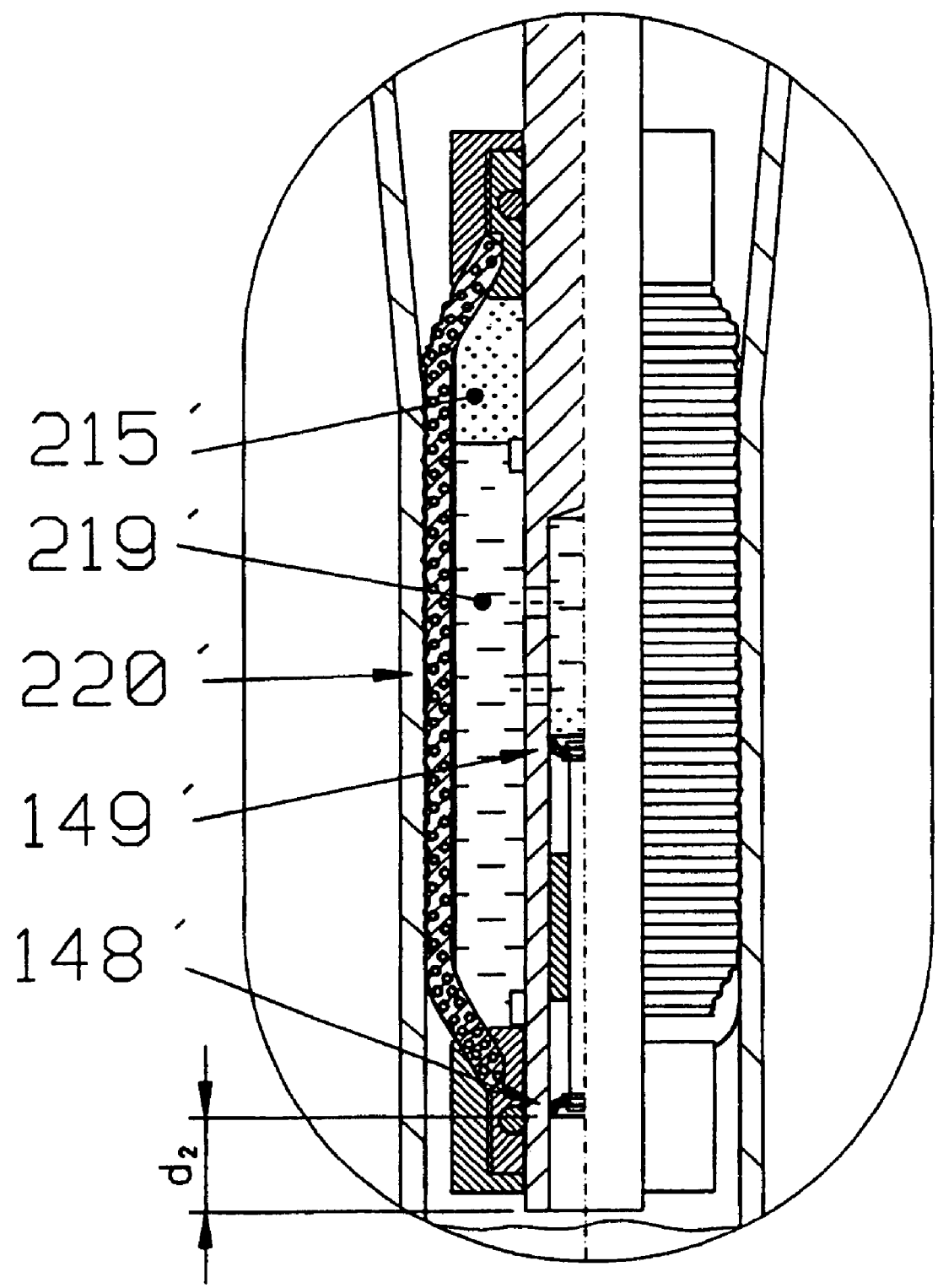
FIG. 12C shows an enlargement of the piston of FIG. 12A at the end of a stroke.

FIG. 12C shows the piston of FIG. 12A at the end of a stroke, while there is still high pressure in the chamber 216. Sealing edge 220'. The load regulating means 148' have a different distance from the orifice 223 towards the chamber. Piston 148' and 149' are shown positioned at a larger distance than in FIG. 12B from the orifice 223: $d_2$.

FIG. 13A,B,C show the combination of a pump with a pressurizing chamber with elastically deformable wall with different areas of the transversal cross sections and a piston with a fixed geometrical shape. Within a housing as e.g. cylinder with fixed geometrical sizes an inflatable chamber is positioned which is inflatable by a medium (a non-compressable and/or a compressable medium). It is also possible that said housing can be avoided. The inflatable wall comprising e.g. a liner-fiber-cover composite or also added an impervious skin. The angle of the sealing surface of the piston is a bit bigger than the comparative angle of the wall of the chamber in relation to an axis parallel to the movement. This difference between said angles and the fact that the momentaneous deformations of the wall by the piston takes place a bit delated (by having e.g. a viscose non-compressable medium in the wall of the chamber and/or the right tuning of load regulating means, which are similar to those which have been shown for the pistons) provides a sealing edge, of which its distance to the central axis of the chamber during the movement between two piston and/or chamber positions can vary. This provides a cross-sectional area changes during a stroke, and by that, a designable operation force. The cross-section of the piston in the direction of the movement however can also be equal, or with a negative angle in relation to the angle of the wall of the chamber—in these cases the 'nose' of the piston ought to be rounded of. In the last mentioned cases it is more difficult to provide a changing cross-sectional area, and by that, a designable operation force. The wall of the chamber can be equiped with all the already showed loading regulating means the one showed on FIG. 12B, and if necessary with the shape regulating means.

FIG. 13A shows piston 230 at four positions of the piston in a chamber 231. Around an inflatable wall a housing 234 with fixed geometrical sizes. Within said wall 234 a compressable medium 232 and a non-compressable medium 233. There can be a valve arrangement for inflation of the wall (not shown). The shape of the piston at the non-pressurized side is only an example to show the principle of the sealing edge.

FIG. 13B shows the piston after the beginning of a stroke. The distance from the sealing edge 235 and the central axis 236 is $z_1$. The angle $\xi$ between the piston sealing edge 235 and the central axis 236 of the chamber. The angle $v$ between the wall of the chamber and the central axis 236. The angle $v$ is shown smaller than the angle $\xi$. The sealing edge 235 arranges that the angle $v$ becomes as big as the angle $\xi$.

Other embodiments of the piston are not shown.

FIG. 13C shows the piston during a stroke. The distance from the sealing edge 235 and the central axis 236 is $z_2$—this distance is smaller than $z_1$.

FIG. 13D shows the piston almost at the end of stroke. The distance from the sealing edge 235 and the central axis 236 is $z_3$—this distance is smaller than $z_2$.

Figure 14:
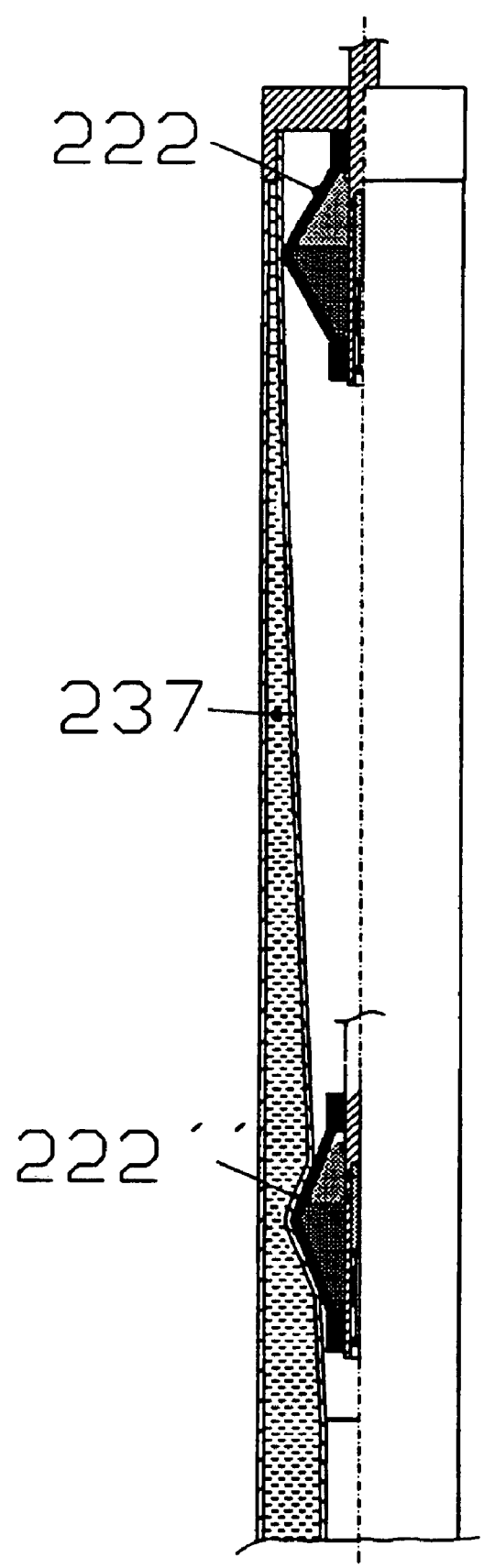
FIG. 14 shows a longitudinal cross-section of a pump with variable different areas of the transversal cross-section of the pressurizing chamber and a piston with variable geometrical sizes—the arrangement of the combination is shown at the beginning, during and at the end of the pump stroke.

FIG. 14 shows a combination of a wall of the chamber and the piston which have changeable geometrical shapes, which adapt to each other during the pump stroke, enabling a continuous sealing. Shown is the chamber of FIG. 13A now with only a non-compressable medium 237 and piston 222 at the beginning of a stroke, while the piston 222" is shown just before the end of a stroke. Also all other embodiments of the piston which can change dimensions can be used here too.

If the piston pump is a handpump for tire inflation purposes it can have an is integrated connector according to those disclosed in PCT/DK96/00055 (including the US Continuation in Part of 18 Apr. 1997), PCT/DK97/00223 and/or PCT/DK98/00507. The connectors can have an integrated pressure gauge of any type. In a piston pump according to the invention used as e.g. a floor pump or 'carpump' for inflation purposes a pressure gauge arrangement can be integrated in this pump.

In the above inflatable pistons with a skin with a fiber architecture has been shown where there is overpressure in the piston in relation to the pressure in the chamber. It is however also possible to have an equal or lower pressure in the piston than in the chamber—the fibers are than under pressure instead of under tension. The resulting shape can be different than those which are shown in the drawings. In that case the loading regulating means have to be tuned differently, and the fibers have to be supported. The load regulating means showed in e.g. FIG. 9D or 12B should than be constructed so that the movement of the piston of the means gives a suction in the piston, e.g. by an elongation of the piston rod, so that the pistons are now at the other side of the holes in the piston rod. The change in the form of the piston is than differently and a collaps can be obtained. This will reduce the life-time.

Through these embodiments, reliable and inexpensive pumps optimized for manual operation, e.g. universal bike pumps to be operated by women and teenagers, can be obtained. The shape of the walls of the pressurerizing chamber (longitudinal and/or transversal cross-section) and/or piston means of the pumps shown are examples and may be changed depending on the pump design specification. The invention can also be used with all kinds of pumps, e.g. multiple-stage piston pumps as well as with dual-function pumps, piston pumps driven by a motor, pumps where e.g. only the chamber or piston is moving as well as types where both the chamber and the piston are moving simultaneously. Any kind of medium can be pumped in the piston pumps. Those pumps can be used for all kinds of applications, e.g. in pneumatic and/or hydraulic applications. And, the invention is also applicable for pumps which are not manually operated. The reduction of the applied force means a substantial reduction of investments for equipment and a substantial reduction of energy during operation. The chambers can be made e.g. by injection moulding, from drawn tubes etc.

The preferred embodiments of the combination of a chamber and a piston has been described as examples to be used in piston pumps. This however should not limit the coverage of this invention to the said application, as it is manly the valve arrangement of the chamber besides the fact which item or medium is initiating the movement, which is descisive for the type of application: pump, actuator, shock absorber or motor. In a piston pump a medium is sucted into a chamber which is thereafter closed by a valve arrangement. The medium is compressed by the movement of the chamber and/or the piston and a valve releases this compressed medium from the chamber. In an actuator a medium is pressed into a chamber by a valve arrangement and the piston and/or the chamber is moving, initiating the movement of an attached devise. In shock absorbers the chamber can be completely closed, wherein the chamber a compressable medium can be compressed by the movement of the chamber and/or the piston. In the case a non-compressable medium is inside the chamber, e.g. the piston can be equipped by several small channels which give a dynamic friction, so that the movement is slowed down. Further the invention can also be used in propulsion applications where a medium is used to move a piston and/or a chamber, which can turn around an axis as e.g. in a motor. The principles according this invention are applicable on all above mentioned applications. The principles of the invention can also be used in other pneumatic and/or hydraulic applications than the above mentioned piston pumps.

The various embodiments described above are provided by way of illustration only and should not be construed to limit the invention. Those skilled in the art will readily recognize various modifications, changes, and combinations of elements which may be made to the present invention without strictly following the exemplary embodiments and applications illustrated and described herein, and without departing from the true spirit and scope of the present invention.

The invention claimed is:

1. A device comprising a combination of a chamber and a piston positioned inside the chamber, the chamber and the piston relatively movable to each other in a predetermined direction of movement between a first position and a second position, characterized by the fact that the cross-section of the piston (230) in a plane perpendicular to the direction of movement is larger at a first piston position than at a second piston position, the change of the crosssection of the piston (230) is essentially continuous between the first piston position and the second piston position, the cross-section of the chamber (231) in a plane perpendicular to the direction of movement is larger at the first position than at the second position, the change of the crosssection of the chamber is essentially continuous between the first position and the second position and the cross-section of the chamber (231) is arranged to adapt itself to the crosssection of the piston (230).

2. A device comprising a combination of a chamber and a piston positioned inside the chamber, said chamber and said piston relatively movable to each other in a predetermined direction of movement between a first position and a second position, characterized by the fact that the cross-section of the piston (20,20', 36,36',49,49, 50,50', 59,59', 76,76', 92,92', 118,118', 138,138', 146,146', 168,168', 189,189', 208,208', 222,222',222") in a plane perpendicular to the direction of movement is larger at a first piston position than at a second piston position, the change of the crosssection of the piston (20,20', 36,36', 49,49', 50,50', 59,59', 76,76', 92, 92', 118,118', 138,138', 146,146', 168,168', 189,189', 208,208', 222,222', 222") is essentially continuous between the first piston position and the second piston position, the cross-section of the chamber (231) in a plane perpendicular to the direction of movement is larger at the first position than at the second position, the change of the cross-section of the chamber (231) is essentially continuous between the first position and the second position and a cross-section of the chamber (231) and the piston (20,20', 36,36', 49,49', 50,50', 59,59', 76, 76', 92,92'118,118'138,138'146,146'168,168'189,189', 208,208', 222,222',222") respectively is arranged to adapt itself to the cross-section of the piston (20,20', 36,36', 49,49', 50,50', 59,59', 76,76', 92,92', 118,118', 138,138', 146,146', 168,168', 189,189', 208,208', 222,222', 222") and the chamber (231), respectively.

* * * * *